United States Patent [19]

Kawaki et al.

[11] Patent Number: 5,543,474
[45] Date of Patent: Aug. 6, 1996

[54] RESIN COMPOSITION

[75] Inventors: Takao Kawaki; Akikazu Amagai; Toshiaki Yamada; Hidefumi Harada; Hajime Ban; Yuji Takeda, all of Tsukuba; Koji Yamamoto, Hiratsuka, all of Japan

[73] Assignee: Mitsubishi Gas Company, Inc., Tokyo, Japan

[21] Appl. No.: 318,833
[22] PCT Filed: Feb. 16, 1994
[86] PCT No.: PCT/JP94/00232
§ 371 Date: Oct. 17, 1994
§ 102(e) Date: Oct. 17, 1994
[87] PCT Pub. No.: WO94/19410
PCT Pub. Date: Sep. 1, 1994

[30] Foreign Application Priority Data

| Feb. 17, 1993 | [JP] | Japan | 5-028090 |
| Feb. 17, 1993 | [JP] | Japan | 5-028091 |
| Feb. 17, 1993 | [JP] | Japan | 5-028092 |
| Apr. 23, 1993 | [JP] | Japan | 5-098119 |
| Apr. 23, 1993 | [JP] | Japan | 5-098120 |
| Apr. 23, 1993 | [JP] | Japan | 5-098121 |
| Jul. 12, 1993 | [JP] | Japan | 5-171606 |

[51] Int. Cl.$^6$ .................. C08L 59/02; C08L 67/02
[52] U.S. Cl. .......... 525/440; 525/425; 525/436
[58] Field of Search .................... 525/425, 436, 525/440

[56] References Cited

U.S. PATENT DOCUMENTS

| 4,313,868 | 2/1982 | Hanson | 260/37 N |
| 4,340,697 | 7/1982 | Aya et al. | 525/420 |
| 4,614,782 | 9/1986 | Nishizawa et al. | 525/424 |
| 5,236,988 | 8/1993 | Doyama et al. | 524/404 |

FOREIGN PATENT DOCUMENTS

| 55-21462 | 2/1980 | Japan |
| 57-195766 | 12/1982 | Japan |
| 59-8755 | 1/1984 | Japan |
| 60-231758 | 11/1985 | Japan |
| 4-236263 | 8/1992 | Japan |

OTHER PUBLICATIONS

Abstract of JP-3 181560, "Aromatic Poly(Amide/Imide) Resin Composition", Aug. 7, 1991.

Primary Examiner—Ana L. Carrillo
Attorney, Agent, or Firm—Wenderoth, Lind & Ponack

[57] ABSTRACT

There is provided a resin composition having well balanced moldability, heat resistance and mechanical strength, which comprises (A) all aromatic polyamideimide resin and (B) a Polyester resin, (C) a polyphenylene sulfide resin or (D) a resin capable of forming an anisotropic molten phase, said aromatic polyamideimide resin containing 5 to 95 mol % of a recurring unit of the formula (1) and 5 to 95 mol % of at least one of a recurring unit of the formula (2) and a recurring unit of the formula (3). Said aromatic polyamideimide resin is prepared by conducting a polymerization reaction of an aromatic tricarboxylic acid anhydride and at least any one of all aromatic dicarboxylic acid and an aliphatic dicarboxylic acid with a diisocyanate compound in plural steps in which in the first step the polymerization reaction is conducted in a temperature range of 50° to 110° C. and in the second and subsequent steps the polymerization reaction is conducted in a temperature range of higher than 110° C. but not higher than 200° C.

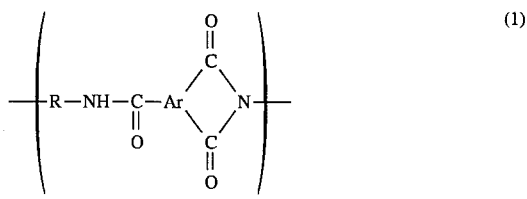

(1)

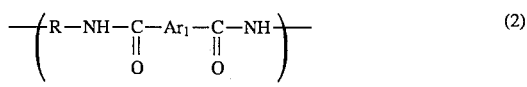

(2)

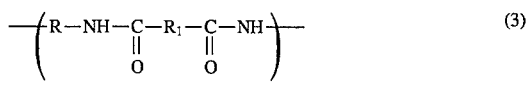

(3)

wherein Ar denotes a trivalent aromatic group, $Ar_1$ denotes a divalent aromatic group, $R_1$ denotes a divalent aliphatic group, and R denotes a divalent aromatic or aliphatic group.

10 Claims, No Drawings

RESIN COMPOSITION

TECHNICAL FIELD

This invention relates to a novel resin composition which is excellent in heat resistance, mechanical strengths and melt moldability.

TECHNICAL BACKGROUND

Aromatic polyamideimide resins are plastic materials excellent in heat resistance, mechanical strengths, electrical properties and chemical resistance, and have been so far used as varnishes, films, etc. An aromatic polyamideimide resin is produced typically by a method in which an aromatic tricarboxylic acid anhydride and a diisocyanate are reacted in a solvent or a method in which an aromatic tricarboxylic acid anhydride halide and a diamine are reacted in a solvent. However, the polyamideimide resins produced by these methods are, though suitably used in the preparation of varnishes, cast films, etc., not suitable for use in melt molding including injection molding because of its inferior melt moldability.

In the specification of U.S. Pat. No. 4,313,868, there is proposed a copolyamideimide for use in injection-molding, said copolyamideimide having the following recurring polyamideimide unit (I) and recurring polyamide unit (II),

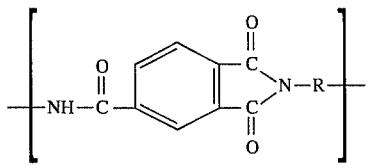

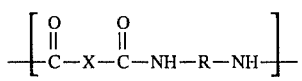

wherein R is a divalent aromatic hydrocarbon radical having about 6 to about 20 carbon atoms or a divalent hydrocarbon which is bound to a group selected from the group consisting of —O—, methylene, —CO— and —SO$_2$— either directly or via a stable linkage, and X is a divalent aromatic radical, the unit (I):unit (II) molar ratio being 80:20 to 20:80.

Compared to a polyamideimide resin free of the recurring unit (II), the above copolyamideimide has improved melt moldability, but a flow starting time in melt-molding of the copolyamideimide is close to a decomposition temperature in melting of the copolyamideimide, so that good molding of the copolyamideimide remains unachieved.

Japanese Laid-open Patent Application (Kokai) No. 59-8,755 (8,755/1984) proposes an abrasion-resistant resin molding material comprising an intimate mixture of (a) 30 to 90% by weight of a polyamideimide resin, (b) 10 to 70% by weight of graphite and/or molybdenum disulfide, and (c) 0 to 30% by weight of at least one member selected from a polyphenylene sulfide resin, a polyamide resin and an aromatic polyester resin which have better flowability than the polyamideimide resin.

The above polyamideimide resin (a) is an aromatic polymer which has 30 to 100 mol % of a recurring unit represented by the formula (III),

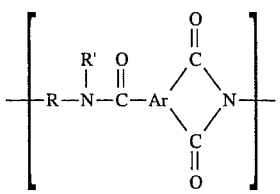

and which may have less than 70 mol % of a polyamide unit represented by the formula (IV).

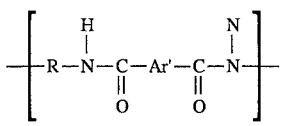

Ar in the formula (III) is a trivalent aromatic group containing at least one 6-membered carbon ring. R in the formulas (III) and (IV) is a divalent aromatic group and/or a divalent aliphatic group. Ar' in the formula (IV) is a divalent aromatic or aliphatic group containing at least one 6-membered carbon ring.

In this document, it is described that at least one member of the resin (c) selected from the polyphenylene resin, the polyamide resin and the aromatic polyester resin is contained in the molding material as a good fluidity imparting agent.

However, said document neither discloses nor suggests this invention.

DISCLOSURE OF THE INVENTION

It is an object of this invention to provide a novel resin composition containing a polyamideimide resin and a polyester resin as main components.

Another object of this invention is to provide a novel resin composition containing a polyamideimide resin and a polyphenylene sulfide resin as main components.

Still another object of this invention is to provide a novel resin composition containing a polyamideimide resin and a liquid crystal polymer as main components.

The other object of this invention is to provide a resin composition which has a good balance among a heat resistance, mechanical properties and a flowability.

In accordance with this invention, the following resin composition is provided to achieve the aforesaid objects of this invention.

That is, in accordance with this invention, there is first provided a resin composition which comprises:

(A) an aromatic copolyamideimide containing 5 to 95 mol % of a recurring unit represented by the formula (1) and 5 to 95 mol % of at least any one of a recurring unit represented by the formula (2) and a recurring unit represented by the formula (3), provided that the total amount of these three recurring units is 100 mol %,

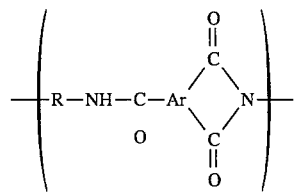

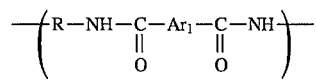

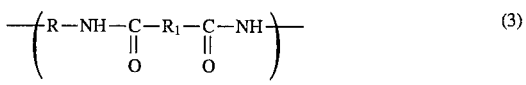

wherein Ar in the formula (1) denotes a trivalent aromatic group containing at least one 6-membered carbon ring, $Ar_1$ in the formula (2) denotes a divalent aromatic group containing at least one 6-membered carbon ring, $R_1$ in the formula (3) denotes a divalent aliphatic group, and R in the formulas (1), (2) and (3) denotes a divalent aromatic or aliphatic group, and (B) a polyester resin, the weight ratio of the aromatic copolyamideimide (A) and the polyester resin (B) ((A)/(B)) being 95/5 to 5/95, and the aromatic copolyamideimide (A) being prepared by conducting a polymerization reaction of an aromatic tricarboxylic acid anhydride and at least any one of an aromatic dicarboxylic acid and an aliphatic dicarboxylic acid with a diisocyanate compound in plural steps such that in the first step the polymerization reaction is conducted in a temperature range of 50° to 110° C. and in the second and subsequent steps the polymerization reaction is conducted in a temperature range of higher than 101° C. but not higher than 200° C.

In accordance with this invention, there is second provided a resin composition which comprises:

(A) an aromatic copolyamideimide containing 10 to 30 mol % of a recurring unit represented by the formula (1) and 70 to 90 mol % of at least any one of a recurring unit represented by the formula (2) and a recurring unit represented by the formula (3), provided that the total amount of these three recurring units is 100 mol %, and (B) a polyester resin, the weight ratio of the aromatic copolyamideimide (A) and the polyester (B) ((A)/(B)) being 95/5 to 5/95.

In accordance with this invention, there is third provided a resin composition which comprises:

(A) an aromatic copolyamideimide containing 5 to 95 mol % of a recurring unit represented by the formula (1) and 5 to 95 mol % of at least any one of a recurring unit represented by the formula (2) and a recurring unit represented by the formula (3), provided that the total amount of these three recurring units is 100 mol %, and (B) a polyester resin (B), the weight ratio of the aromatic copolyamideimide (A) and the polyester (B) ((A)/(B)) being at least 10/90 but less than 50/50.

In accordance with this invention, there is fourth provided a resin composition which comprises:

(A) an aromatic copolyamideimide containing 5 to 95 mol % of a recurring unit represented by the formula (1) and 5 to 95 mol % of at least any one of a recurring unit represented by the formula (2) and a recurring unit represented by the formula (3), provided that the total amount of these three recurring units is 100 mol %, and (C) a polyphenylene sulfide resin, the weight ratio of the aromatic copolyamideimide (A) and the polyphenylene sulfide resin (C) ((A)/(C)) being 95/5 to 5/95, and the aromatic copolyamideimide (A) being prepared by conducting a polymerization reaction of an aromatic tricarboxylic acid anhydride and at least any one of an aromatic dicarboxylic acid and an aliphatic dicarboxylic acid with a diisocyanate compound in plural steps such that in the first step the polymerization reaction is conducted in a temperature range of 50° to 110° C. and in the second and subsequent steps the polymerization reaction is conducted in a temperature range of higher than 110° C. but not higher than 200° C.

In accordance with this invention, there is fifth provided a resin composition which comprises:

(A) an aromatic copolyamideimide containing 10 to 30 mol % of a recurring unit represented by the formula (1) and 70 to 90 mol % of at least any one of a recurring unit represented by the formula (2) and a recurring unit represented by the formula (3), provided that the total amount of these three recurring units is 100 mol %, and (C) a polyphenylene sulfide resin, the weight ratio of the aromatic copolyamideimide (A) and the polyphenylene sulfide resin (C) ((A)/(C)) being 95/5 to 5/95.

In accordance with this invention, there is sixth provided a resin composition which comprises:

(A) an aromatic copolyamideimide containing 5 to 95 mol % of a recurring unit represented by the formula (1) and 5 to 95 mol % of at least any one of a recurring unit represented by the formula (2) and a recurring unit represented by the formula (3), provided that the total amount of these three recurring units is 100 mol %, and (C) a polyphenylene sulfide resin, the weight ratio of the aromatic copolyamideimide (A) and the polyphenylene sulfide resin (C) ((A)/(C)) being at least 10/90 but less than 50/50.

In accordance with this invention, there is seventh provided a resin composition which comprises:

(A) an aromatic copolyamideimide containing 5 to 95 mol % of a recurring unit represented by the formula (1) and 5 to 95 mol % of at least any one of a recurring unit represented by the formula (2) and a recurring unit represented by the formula (3), provided that the total amount of these three recurring units is 100 mol %, and (D) a thermoplastic resin capable of forming an anisotropic molten phase, the weight ratio of the aromatic copolyamideimide and the thermoplastic resin (D) ((A)/(D)) being 95/5 to 5/95.

This invention will be described in more detail below, which will make clear the objects, advantages and effects of this invention.

Best Embodiments to Practise the Invention

This invention involves, as a generic concept, a resin composition comprising an aromatic copolyamideimide (A) and a polyester resin (B), a resin composition comprising an aromatic copolyamideimide (A) and a polyphenylene sulfide resin (C), and a resin composition comprising an aromatic copolyamideimide (A) and a thermoplastic resin (D) capable of forming an anisotropic molten phase.

The aromatic copolyamideimide (A) used in the resin composition of this invention is composed of the recurring unit represented by the above formula (1) (hereinafter referred to at times as a "recurring unit (1)) and at least any one of the recurring unit represented by the above formula (2)(hereinafter referred to at times as a "recurring unit (2)") and the recurring unit represented by the above formula (3) (hereinafter referred to at times as a "recurring unit (3)").

When the total content of the recurring units (1), (2) and (3) is 100 mol %, the content of the recurring unit (1) is 5 to 95 mol %, and the content of the recurring unit (2) and/or the recurring unit (3) is 5 to 95 mol %.

Preferably, the content of the recurring unit (1) is 10 to 70 mol %, and the content of the recurring unit (2) and/or the recurring unit (3) is 30 to 90 mol %. More preferably, the content of the recurring unit (1) is 10 to 50 mol %, and the content of the recurring unit (2) and/or the recurring unit (3) is 50 to 90 mol %. Especially preferably, the content of the recurring unit (1) is 10 to 30 mol %, and the content of the recurring unit (2) and/or the recurring unit (3) is 70 to 90 mol %. Further, it is preferred that the aromatic copolyamideimide contains at least 1 mol % of each of the recurring unit (2) and the recurring unit (3).

However, when the resin composition of this invention is composed of the aromatic polyamideimide resin (A) and the polyphenylene sulfide resin (C) and the aromatic polyamideimide resin (A) does not contain the recurring unit (2), it is preferable that the content of the recurring unit (1) is 50 to 95 mol % and the content of the recurring unit (3) is 5 to 50 mol %; it is more preferable that the content of the recurring unit (1) is 60 to 95 mol % and the content of the recurring unit (3) is 5 to 40 mol %; it is especially preferable that the content of the recurring unit (1) is 70 to 90 mol % and the content of the recurring unit (3) is 10 to 30 mol %.

It is preferable that the aromatic copolyamideimide (A) is composed essentially of the recurring units (1) and (2) and/or (3) alone. The total amount of the recurring units (1), (2) and (3) is preferably at least 90 mol %, especially preferably at least 95 mol % of all the units.

In the formula (1), Ar is a trivalent aromatic group containing at least one 6-membered carbon ring, preferably a trivalent aromatic group containing 6 to 13 carbon atoms. Specific examples of Ar are as follows.

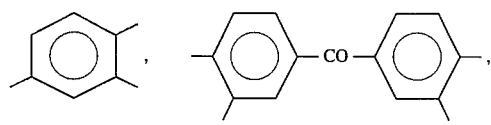

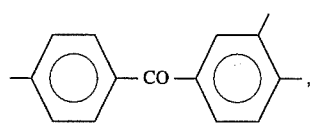

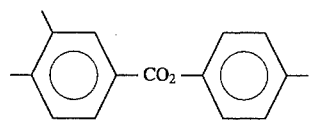

Of these, the following is a preferable group.

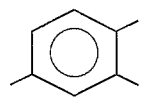

In the formulas (1), (2) and (3), R is a divalent aromatic group, preferably a divalent aromatic group having 6 to 15 carbon atoms, or a divalent aliphatic group, preferably an aliphatic group having 2 to 12 carbon atoms. R's in the formulas (1), (2) and (3) can be the same or different.

Specific examples of R are the following divalent groups.

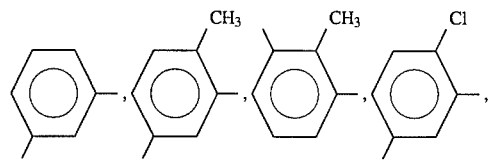

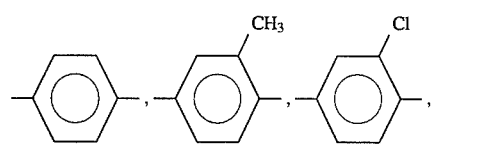

-continued

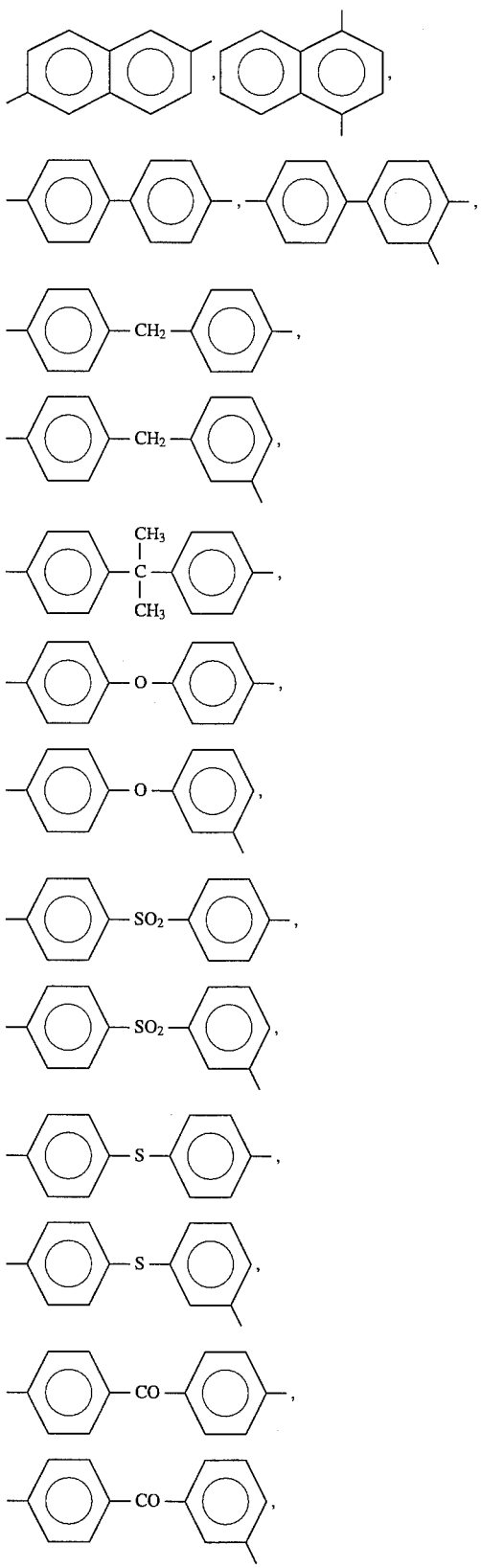

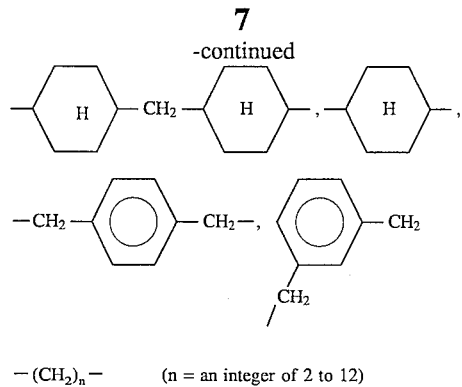

$-(CH_2)_n-$ (n = an integer of 2 to 12)

Preferable examples of these groups are the following groups.

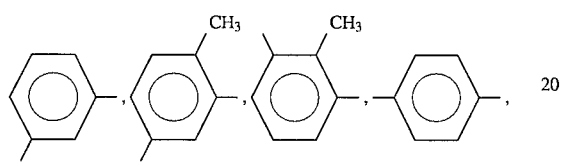

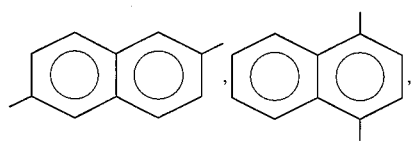

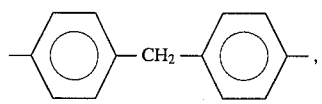

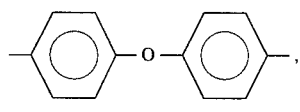

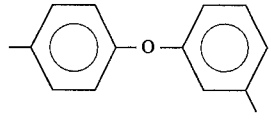

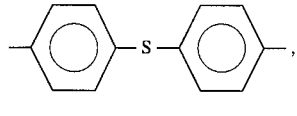

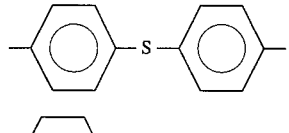

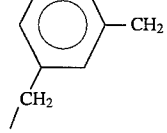

Especially preferable examples of these are the following groups.

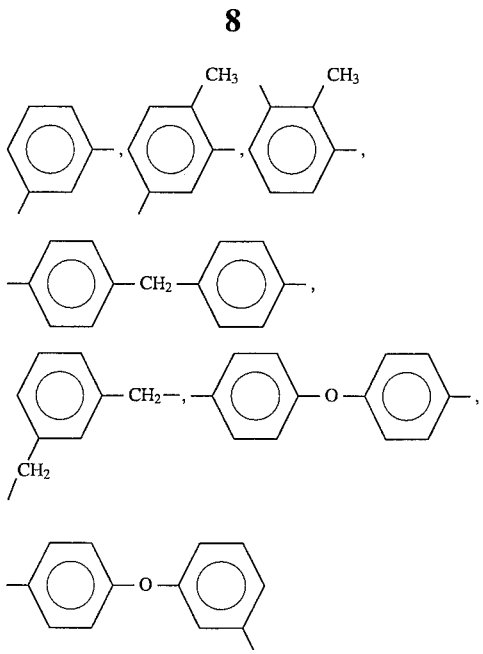

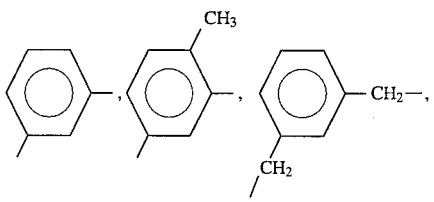

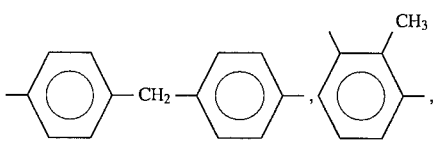

Most preferable examples of R are the following groups.

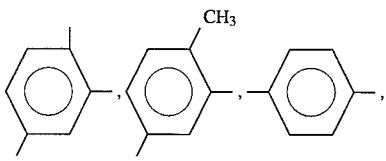

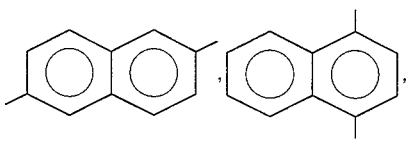

$Ar_1$ in the formula (2) is a divalent aromatic group containing at least one 6-membered carbon ring, preferably a divalent aromatic group having 6 to 13 carbon atoms.

Specific examples of $Ar_1$ are the following divalent groups.

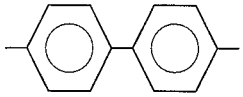

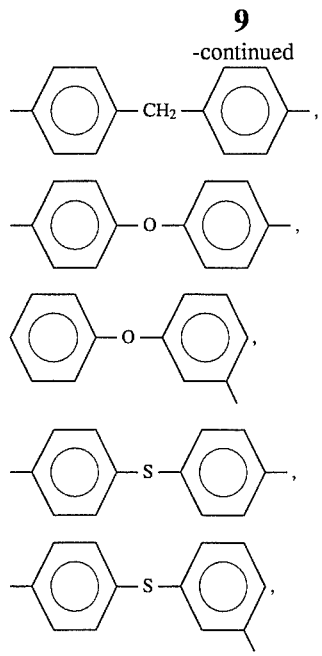

Preferable examples of these are the following groups.

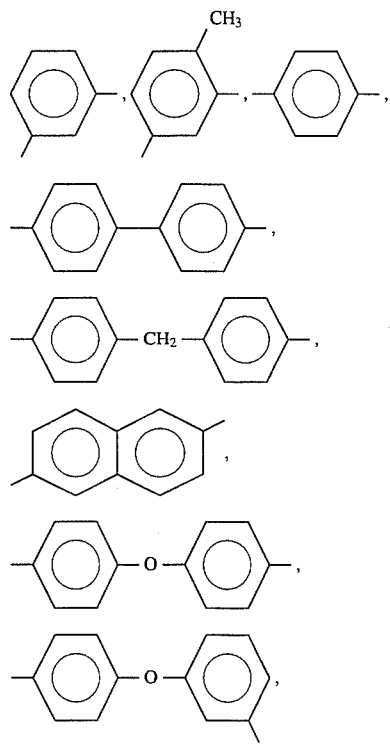

Especially preferable examples of $Ar_1$ are the following groups.

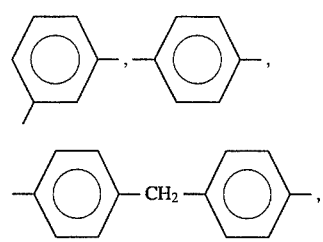

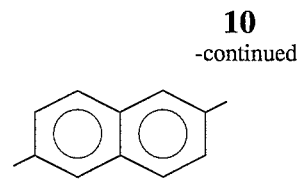

$R_1$ in the formula (3) is a divalent aliphatic group, preferably a divalent aliphatic group having 2 to 20 carbon atoms. A specific example of $R_1$ is a linear alkylene group represented by the formula

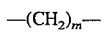

wherein m is an integer of 2 to 20. A linear alkylene group wherein m is an integer of 4 to 12 is a preferable example.

A degree of polymerization of the aromatic copolyamideimide (A) is, when expressed in terms of a reduced viscosity measured in a dimethylformamide solvent at 30° C. in a concentration of 1 g/dl, preferably 0.1 to 2.0 dl/g, more preferably 0.1 to 1.0 dl/g, most preferably 0.2 to 0.7 dl/g.

The aromatic copolyamideimide (A) may be a random copolymer in which the recurring units (1) and (2) and/or (3) are substantially randomly arranged, an alternating copolymer in which these units are alternately arranged, or a block copolymer in which these units are individually bound to form block chains and these block chains are bound to one another.

The aromatic copolyamideimide (A) can be produced by any of the following methods (a), (b) and (c).

(a) a method in which an aromatic tricarboxylic acid anhydride and an aromatic dicarboxylic acid and/or an aliphatic dicarboxylic acid are reacted with a diisocyanate compound in an amide group-containing solvent or an amide group-free solvent to produce the copolymer (A).

(b) a method in which an aromatic tricarboxylic acid anhydride halide and an aromatic dicarboxylic acid dihalide and/or an aliphatic dicarboxylic acid dihalide are reacted with a diamine compound in the above solvent to produce the copolymer (A).

(c) a method in which an aromatic tricarboxylic acid anhydride and an aromatic dicarboxylic acid and/or an aliphatic dicarboxylic acid are reacted with a diamine compound in the presence of a polycondensation catalyst such as phosphoric acid or a phosphorous acid ester.

Of the aforesaid methods, the method described in (b) involves a problem that a halogen remains in the aromatic copolyamideimide (A) and intricacy in production that heating is conducted at high temperatures to form an imide ring.

The method described in (c) also involves intricacy in production that heating is conducted at high temperatures to form an imide ring. Accordingly, the method described in (a) is most preferred.

According to the method (a), a method for producing the aromatic copolyamideimide will be explained below.

The aromatic tricarboxylic acid anhydride, the aromatic dicarboxylic acid, the aliphatic dicarboxylic acid and the diisocyanate compound which are raw materials used to produce the aromatic copolyamideimide (A) by the above method (a) are as follows.

Aromatic tricarboxylic acid anhydride

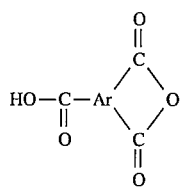

wherein Ar is as defined in the formula (1).
Aromatic dicarboxylic acid

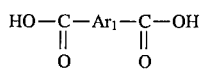

wherein $Ar_1$ is as defined in the formula (2).
Aliphatic dicarboxylic acid

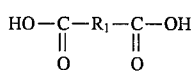

wherein $R_1$ is as defined in the formula (2).
Diisocyanate compound

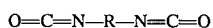

wherein R is as defined in the formulas (1) to (3).

In the reaction, it is desirable that the amounts of the acid component (the aromatic tricarboxylic acid anhydride, the aromatic dicarboxylic acid and the aliphatic dicarboxylic acid) and the diisocyanate compound meet $0.9<Q/P<1.1$, especially $0.99<Q/P<1.01$ wherein Q is a molar amount of the acid component and P is a molar amount of the diisocyanate compound.

The aromatic copolyamideimide (A) can be prepared by dissolving the predetermined amounts of the above raw materials in a solvent and subsequently conducting the polymerization reaction. The temperature of the polymerization reaction is preferably 50° to 200° C., more preferably 80° to 180° C., especially preferably 80° to 170° C. In the above range of the temperature, the aromatic copolyamideimide (A) can be obtained which has a suitable degree of polymerization and does not impede a melt-moldability of the resin composition of this invention.

The polymerization reaction is conducted in plural steps, preferably in two or three steps, and the temperature is elevated in each step, whereby the better aromatic copolyamideimide (A) can be produced. That is, the copolyamideimide (A) having excellent melt moldability and toughness can be produced by conducting the polymerization reaction such that the temperature range in the first step is 50° to 110° C. and the temperature ranges in the second and subsequent steps are higher than 110° C. but not higher than 200° C.

In this manner, the polymerization reaction is conducted in plural steps, in which formation of the amide group can be terminated in the first reaction step and an imide can be formed in the subsequent reaction steps at higher temperatures. Consequently, the resulting copolymer (A) is substantially free from a complicated three-dimensional structure.

Any temperatures can be set in the respective steps within the aforesaid temperature ranges. For example, within the above temperature ranges, the temperatures may be elevated or maintained constant. Further, the elevation of the temperature may be combined with the maintenance of the constant temperature. Most preferable is that the polymerization reaction is conducted by making the temperature in one step higher by 20° to 80° C. than that in the preceding step and maintaining the temperature in each step constant.

As the solvent in the polymerization reaction, a solvent having a solubility in the resulting polyamideimide and a polar solvent having no solubility in the polyamideimide can be used. Specific examples of the solvent having a solubility in the polyamideimide include N-methylpyrrolidone, dimethylformamide, dimethylacetamide, dimethylsulfoxide, dimethylsulfolane, tetramethylenesulfone, diphenylsulfone and γ-butyrolactone. Specific examples of the polar solvent having no solubility in the polyamideimide include nitrobenzene, nitrotoluene, acetonitrile, benzonitrile, acetophenone, nitromethane, dichlorobenzene and anisole. The solvent having a solubility in the polyamideimide and the solvent having no solubility in the polyamideimide may be used singly or in combination. Of the above solvents, the solvent having a solubility in the polyamideimide is preferable.

The solvent is used preferably on condition that the ratio of the raw materials to the solvent is 0.1 to 4 mols/liter (raw materials/solvent).

In the polymerization reaction, it is possible to use a variety of conventionally known catalysts used for forming an amide group by the reaction of an isocyanate group and a carboxyl group. In order not to impair a melt moldability and a processability of the copolymer (A), the amount of the catalyst shall be reduced to the necessary minimum. Of course, the reaction can be conducted in the absence of a catalyst. Specific examples of the catalyst include tertiary amines such as pyridine, quinoline, isoquinoline, trimethylamine, triethylamine, tributylamine, N,N-diethylamine, γ-picoline, N-methylmorpholine, N-ethylmorpholine, triethylenediamine and 1,8-diazabicyclo[5,4,0]undecene-7; and weakly acidic metal salts (heavy metal salts and alkali metal salts) such as cobal acetate, cobalt naphthenate and sodium oleate.

In the polymerization reaction, it is advisable that the mixture containing the raw materials, the solvent and optionally the catalyst is substantially free from water. The amount of water present is preferably at most 500 ppm, more preferably at most 100 ppm, especially preferably at most 50 ppm. Excess water impairs a melt moldability of the copolymer (A).

After the polymerization reaction, the copolymer is precipitated with alcohols such as methanol and isopropyl alcohol, ketones such as acetone and methyl ethyl ketone and aliphatic and aromatic hydrocarbons such as heptane and toluene, and successively washed, thereby recovering the aromatic copolyamideimide (A). Another method is that the aromatic copolyamideimide (A) can be recovered by distilling off the polymerization solvent. The other method is that after the solvent is distilled off to some extent, the product containing a small amount of the solvent is fed to an extruder, and the product is pelletized to recover the aromatic polyamideimide, while the solvent is removed from a vent hole provided in the extruder under reduced pressure. This method is suitable.

The polyester resin (B) used in the resin composition of this invention is a thermoplastic resin having an ester linkage in the main chain of the molecule. Specific examples of the polyester resin (B) include a polycondensate obtained from a dicarboxylic acid or its derivative and a dihydric alcohol or a dihydric phenol compound; a polymer obtained from a dicarboxylic acid or its derivative and a cyclic ether compound; a polycondensate obtained from a dicarboxylic acid metal salt and a dihalogen compound; and a product resulting from ring opening polymerization of a cyclic ester compound. The derivative of the dicarboxylic acid here referred to includes an acid anhydride, an ester and an acid halide.

The dicarboxylic acid can be an aliphatic or aromatic dicarboxylic acid.

Examples of the aromatic dicarboxylic acid include terephthalic acid, isophthalic acid, phthalic acid, chlorophthalic acid, nitrophthalic acid, p-carboxylphenylacetic acid, p-phenylenediacetic acid, m-phenylenediglycolic acid, p-phenylenediglycolic acid, diphenyl diacetic acid, diphenyl-p,p'-dicarboxylic acid, diphenyl ether-p,p'-dicarboxylic acid, diphenyl-m,m'-dicarboxylic acid, diphenyl-4,4'-diacetic acid, diphenylmethane-p,p'-dicarboxylic acid, diphenylethane-p,p'-dicarboxylic acid, stilbenedicarboxylic acid, diphenylbutane-p,p'-dicarboxylic acid, benzophenone-4,4'-dicarboxylic acid, naphthalene-1,4-dicarboxylic acid, naphthalene-1,5-dicarboxylic acid, naphthalene-2,6-dicarboxylic acid, naphthalene-2,7-dicarboxylic acid, p-carboxyphenoxyacetic acid, p-carboxyphenoxybutyric acid, 1,2-diphenoxypropane-p,p'-dicarboxylic acid, 1,3-diphenoxypropane-p,p'-dicarboxylic acid, 1,4-diphenoxybutane-p,p'-dicarboxylic acid, 1,5-diphenoxypentane-p,p'-dicarboxylic acid, 1,6-diphenoxyhexane-p,p'-dicarboxylic acid, p-(p-carboxyphenoxy)benzoic acid, 1,2-bis(2-methoxyphenoxy)ethane-p,p'-dicarboxylic acid, and 1,3-bis(2-methoxyphenoxy)-propane-p,p'-dicarboxylic acid.

Examples of the aliphatic dicarboxylic acid include oxalic acid, succinic acid, adipic acid, cork acid, mazelaic acid, sebacic acid, dodecanedicarboxylic acid, undecanedicarboxylic acid, maleic acid, and fumaric acid. Preferable is the aromatic dicarboxylic acid, and more preferable are terephthalic acid, isophthalic acid and naphthalene-2,6-dicarboxylic acid.

Examples of the dihydric alcohol include ethylene glycol, propane-1,2-diol, propane-1,3-diol, butane-1,3-diol, butane-1,4-diol, 2,2-dimethylpropane-1,3-diol, cis-2-butene-1,4-diol, trans-2-butene-1,4-diol, tetramethylene glycol, pentamethylene glycol, hexamethylene glycol, heptamethylene glycol, octamethylene glycol, and decamethylene glycol. Preferable are ethylene glycol, propane-1,2-diol, propane-1,3-diol, butane-1,3-diol, and butane-1,4-diol. More preferable are ethylene glycol, and butane-1,4-diol.

Examples of the dihydric phenol compound include hydroquinone, resorcin, 4,4'-dihydroxydiphenyl, bis(4-hydroxyphenyl)methane, 2,2-bis(4-hydroxyphenyl)propane, 1,1-bis(4-hydroxyphenyl)cyclohexane, bis(4-hydroxyphenyl)ether, bis(4-hydroxyphenyl)sulfone, bis(4-hydroxyphenyl)sulfide, bis(4-hydroxyphenyl) ketone, and 4-hydroxyphenyl-3-hydroxyphenyl ketone.

Examples of the cyclic ether compound include ethylene oxide and propylene oxide. Examples of the cyclic ester compound include ε-caprolactone and δ-valerolactone.

The dihalogen compound which is reacted with the dicarboxylic acid metal salt is a compound obtained by replacing a hydroxyl group of a dihydric alcohol or a dihydric phenol compound with a halogen atom such as chlorine or bromine.

The polyester which is used in the resin composition of this invention is prepared using the above raw materials by a method known per se such as an ester interchange method, a direct esterification method or an interfacial polycondensation method.

The preferable polyester resin (B) which is used to keep a good balance of a melt moldability and a heat resistance in the resin composition of this invention is a crystalline aromatic polyester obtained from an aromatic dicarboxylic acid or its derivative and a dihydric alcohol as raw materials. Preferable examples of the aromatic polyester include polyalkylene terephthalates (in which an alkylene having 2 to 6 carbon atoms is preferable) such as polyethylene terephthalate and polybutylene terephthalate, and polyalkylene-2,6-naphthalenedicarboxylates (in which an alkylene having 2 to 6 carbon atoms is preferable) such as polyethylene-2,6-naphthalenedicarboxylate and polybutylene-2,6-naphthalenedicarboxylate.

The most preferable examples of the polyester resin (B) are polyethylene terephthalate and polybutylene terephthalate.

The weight average molecular weight of the polyester resin (B) is preferably at least 20,000, for example.

The weight ratio of the aromatic copolyamideimide (A) and the polyester resin (B) ((A)/(B)) is 5/95 to 95/5, preferably 10/90 to 70/30, more preferably 10/90 to 65/35, most preferably at least 10/90 but less than 50/50. Such mixing ratio gives an excellent balance of a flowability and a heat resistance to the resin composition of this invention.

The resin composition of the aromatic copolyamideimide (A) and the polyester resin (B) is produced by melt-kneading the respective components, and the temperature for the melt-kneading is 200° to 400° C., preferably 230° to 380° C. The melt-kneading can be carried out with an extruder, a kneader, a Banbury mixer, rolls or the like. A twin-screw extruder is preferable.

The polyester resin (B) may be a polyester resin capable of forming an anisotropic molten phase or a polyester resin incapable of forming an anisotropic molten phase and capable of forming an isotropic molten phase alone.

The polyphenylene sulfide resin (C) which is another resin used in the resin composition of this invention is a polymer containing at least 70 mol %, more preferably at least 90 mol %, most preferably substantially 100 mol % of a recurring unit (p-phenylene sulfide group) represented by the formula.

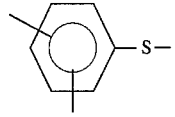

As a polymerization method for obtaining the polyphenylene sulfide resin (C), a variety of methods known per se can be employed. For example, a method in which sodium sulfate and p-dichlorobenzene are reacted in an amide group-containing solvent such as N-methylpyrrolidone or dimethylacetamide or a sulfone group-containing solvent such as sulfolane. On this occasion, it is advisable to add an alkali metal carboxylate such as sodium acetate, lithium acetate or the like for adjusting a degree of polymerization.

The polyphenylene sulfide resin includes a relatively low-molecular-weight substance (e.g., Japanese Patent Publication No. 45-3,368 (3,368/1970)) and a linear high-molecular-weight substance (e.g., Japanese Patent Publication No. 52-12,240 (12,240/1977, corresponding to U.S. Pat. No. 3,919,177 and U.S. Pat. No. 4,016,145)) depending on a process for producing same. The relatively low-molecular-weight substance can be used as the polyphenylene resin (C) of this invention by making it high-molecular-weight with heating in an oxygen atmosphere or in the presence of a crosslinking agent such as a peroxide. The linear high-molecular-weight polyphenylene sulfide resin can, of course, be preferably used as the polyphenylene resin (C).

The melt viscosity at 300° C. of the polyphenylene sulfide resin (C) is 100 to 100,000 poises, preferably 300 to 30,000 poises, more preferably 300 to 10,000 poises, most preferably 500 to 8,000 poises.

The polyphenylene sulfide resin (C) can contain other group than the p-phenylene sulfide group of the above formula. Examples of the other group include an m-phenylene sulfide group; a biphenylene group; a phenylene sulfide group substituted with an amino group, a carboxyl group, an alkyl group, a nitro group, a phenyl group or/and an alkoxy group; a divalent group containing an ether group; a divalent group containing a sulfone group; and a trivalent group represented by the following formula.

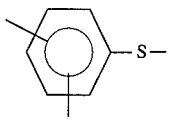

The other unit can be present in the polyphenylene sulfide resin (C) in such an amount that the crystallinity of the polyphenylene sulfide resin (C) is not much affected. The content of the other unit is less than 30 mol %, preferably less than 10 mol %.

The polyphenylene sulfide resin (C) can contain a —SH group in the terminal of the high-molecular chain. In some cases, a desirable resin composition is obtained by properly selecting the composition of the resin composition and the conditions for kneading the aromatic polyamideimide resin (A) and the polyphenylene sulfide resin (C) and by using the polyphenylene sulfide resin (C) containing the —SH group in an amount of at least 10 mg eq., preferably at least 20 mg eq. per kilogram of the resin in the terminal of the high-molecular-chain.

The —SH group can be introduced by a method known per se. For example, the —SH group can easily be introduced into the terminal by the treatment with hydrochloric acid or acetic acid at the last stage of producing the polyphenylene sulfide resin or by treating the purified polyphenylene sulfide resin with an acetone solution of hydrochloric acid or acetic acid.

The weight ratio of the aromatic polyamideimide resin (A) and the polyphenylene sulfide resin (C) ((A)/(C)) is 95/5 to 5/95, preferably 10/90 to 70/30, more preferably 10/90 to 50/50, most preferably 20/80 to 50/50. Such ratio provides the resin composition of this invention with an excellent balance of a flowability and a heat resistance.

The resin composition of the aromatic polyamideimide (A) and the polyphenylene sulfide resin (C) is produced by melt-kneading the respective components. The temperature for melt-extruding is 250° to 400° C., preferably 280° to 400° C. The melt-extruding can be carried out with an extruder, a kneader, a Banbury mixer, rolls or the like. A twin-screw extruder is preferable.

The molten phase of the polyphenylene sulfide resin (C) is isotropic.

The thermoplastic resin (D) capable of forming an anisotropic molten phase (hereinafter referred to at times as a "liquid crystal polymer (D)") which is another resin used in the resin composition of this invention includes an aromatic polyester capable of forming an anisotropic molten phase (a liquid crystal aromatic polyester), an aromatic polyester imide capable of forming an anisotropic molten phase (a liquid crystal aromatic polyester imide), an aromatic polyester amide capable of forming an anisotropic molten phase (a liquid crystal aromatic polyester amide), and a polycarbonate capable of forming an anisotropic molten phase (a liquid crystal polycarbonate).

As a preferable typical example of the liquid crystal polymer (D) used In this invention, a liquid crystal aromatic polyester or a liquid crystal aromatic polyester amide composed substantially of a recurring unit represented by the formula (4) (hereinafter referred to at times as a "recurring unit (4)")

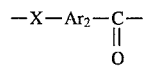

wherein $Ar_2$ is a divalent aromatic group containing at least one 6-membered carbon ring, and X is a divalent group represented by —O— or —NH—, can be mentioned.

In the above liquid crystal polymer, $Ar_2$ is preferably p-phenylene or/and 2,6-naphthylene, and a liquid crystal polymer containing both of them is more preferable. A liquid crystal polymer containing 10 to 90 mol % of p-phenylene based on the total amount of p-phenylene and 2,6-naphthylene is all the more preferable.

Another preferable typical example of the liquid crystal polymer (D) used in this invention is a liquid crystal copolymer containing the recurring unit (4), at least one member selected from the group consisting of recurring units represented by the formulas (5), (6) and (7), and at least one member selected from the group consisting of recurring units represented by the formulas (8) and (9).

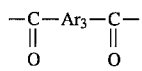

wherein $Ar_3$ is as defined about $Ar_1$ in the above formula (2) including preferable examples.

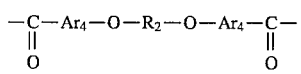

wherein $Ar_4$ is as defined about $Ar_2$ in the above formula (4) including preferable examples, and $R_2$ is as defined about $R_1$ in the above formula (3).

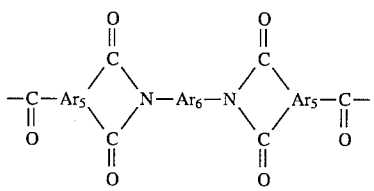

wherein $Ar_5$ is as defined about Ar in the above formula (1) including preferable examples, and $Ar_6$ is as defined about $Ar_1$ including preferable examples.

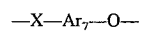

wherein X is a divalent group represented by —O— or —NH—, and $Ar_7$ represents a divalent aromatic group containing at least one 6-membered carbon ring.

wherein $R_3$ is as defined about $R_1$ in the above formula (3).

$Ar_7$ in the formula (8) is, as mentioned above, a divalent aromatic group containing at least one 6-membered carbon ring. Specific examples of this group are the same as those of the divalent aromatic group shown about R in the above formula (3).

Preferable examples of $Ar_7$ include the following divalent groups.

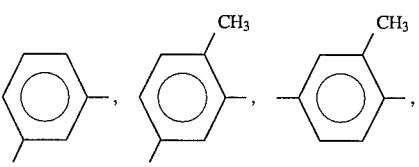

-continued

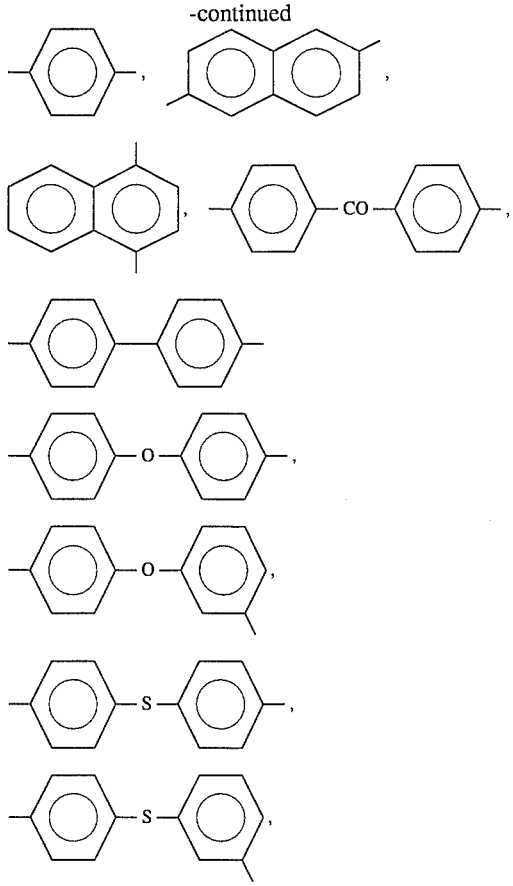

Especially preferable examples of Ar$_7$ include the following divalent groups.

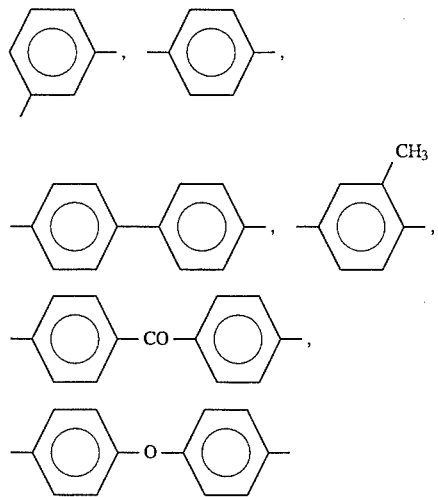

R$_3$ in the formula (9) is, as mentioned above, as defined about the divalent group of R$_1$ in the above formula (3), and a preferable example thereof is represented by the formula,

wherein m is an integer of 2 to 20, preferably an integer of 2 to 12, most preferably an integer of 2 to 6.

In the above liquid crystal copolymer, the total molar amount of the recurring units (5), (6) and (7) is practically equal to the total molar amount of the recurring units (8) and (9).

In the liquid crystal copolymer, the recurring unit (4) is preferably 5 to 80 mol %, more preferably 10 to 70 mol %, based on the total amount of all the units. When the liquid crystal copolymer contains the recurring units (5) and (6), the recurring unit (6) is preferably 1 to 90 mol %, especially preferably 5 to 60 mol %, based on the total amount of the recurring units (5) and (6). When the liquid crystal copolymer contains the recurring units (5) and (7), the recurring unit (7) is preferably 1 to 90 mol %, especially preferably 5 to 60 mol %, based on the total amount of the recurring units (5) and (7).

Among examples of the liquid crystal polymer (D) shown above, preferred are a liquid crystal polyester wherein X in the recurring unit (4) is —O— and X in the recurring unit (8) if present, is —O—, and a liquid crystal polyester amide wherein X in the recurring unit (4) is —NH— and X in the recurring unit (8) if present, is —NH—.

More preferable examples of the liquid crystal polymer (D) are types W, X, Y and Z tabulated below.

TABLE

| More preferable liquid crystal polymers | |
|---|---|
| Type | Recurring units |
| W | (4) |
| X | (4), (5) and (9) |
| Y | (4), (5), (6) and (8) |
| Z | (4), (5), (7) and (8) |

In the above table, for example, the liquid crystal polymer of type X shall be interpreted to consist essentially of the recurring units (4), (5) and (9).

Of these types, types W, Y and Z are more preferable. Types Y and Z are especially preferable, and type Z is most preferable.

In the liquid crystal polymer of type Z, it is preferable that Ar$_2$ in the recurring unit (4) and Ar$_3$ in the recurring unit (5) are each p-phenylene or/and 2,6-naphthylene, that Ar$_6$ in the recurring unit (7) is a divalent group of the following structure,

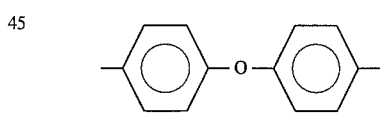

and that Ar$_7$ in the recurring unit (8) is the divalent group of the above structure or p-phenylene.

The liquid crystal polymer (D) varies depending on the structure, but preferably has, for example, a logarithmic viscosity (measured in a pentafluorophenol solvent at 60° C. in a concentration of 0.16 g/dl) of about 0.3 dl/g or more, said logarithmic viscosity being a criterion of the molecular weight. Further, the liquid crystal polymer (D) is preferably capable of melt-molding.

The above liquid crystal polymer (D) can be produced by a method known per se. Typical examples of the method for producing the liquid crystal polymester include the following (a) and (b). The liquid crystal polyester amide can be produced in the same manner.

(a) a method in which the liquid crystal polymester is produced by a polycondensation reaction from a dicarboxylic acid, an acetic acid ester of an aromatic dihydroxy compound and an acetic acid ester of an aromatic hydroxy acid.

(b) a method in which the liquid crystal polymester is produced by a polycondensation reaction from a dicarboxylic acid diphenyl ester, an aromatic dihydroxy compound and an aromatic hydroxy acid phenyl ester.

Especially, the method (a) is preferable in that the polycondensation reaction proceeds in the absence of a catalyst.

The liquid crystal polyester belonging to the above type Y can be produced by an ester interchange reaction of a polyester, typically polyethylene terephthalate, obtained by a polycondensation reaction of an aliphatic diol and an aromatic dicarboxylic acid, with an acetic acid ester of an aromatic hydroxy acid.

The weight ratio of the aromatic copolyamideimide (A) and the thermoplastic resin (D) capable of forming the anisotropic molten phase ((A)/(D)) is 5/95 to 95/5, preferably at least 10/90 but less than 80/20, more preferably at least 10/90 but less than 70/30, most preferably at least 10/90 but less than 50/50.

The mixing ratio in the above range provides the resin composition of this invention with a good balance of a flowability, a heat resistance and mechanical characteristics and a less anisotropy of the properties.

When the resin composition of this invention is produced by melt-kneading the aromatic copolyamideimide (A) and the liquid crystal polymer (D), the temperature for melt-kneading is 250° to 400° C., preferably 280° to 400° C., and an extruder, a kneader, a Banbury mixer, rolls or the like can be used as a melt-kneading device. A twin-screw extruder is preferred.

The resin composition of this invention can properly contain, as required, additives such as a filler, a pigment, a plasticizer, a stabilizer, an ultraviolet absorber, a flame retardant, and a flame retardant aid, other resins and an elastomer.

Examples of the filler include mineral fillers such as glass beads, wollastonite, mica, talc, Kaolin clay, silicon dioxide, asbestos, calcium carbonate, magnesium hydroxide, silica, diatomaceous earth, graphite, carborundum and molybdenum disulfide; inorganic fibers such as a glass fiber, a milled fiber, a potassium titanate fiber, a boron fiber, a silicon carbide fiber, and fibers of metals such as brass, aluminum and zinc; organic fibers typified by a carbon fiber and an aramid fiber; and flakes of aluminum and zinc. The amount of the filler is preferably 1 to 70% by weight based on the whole resin composition.

Preferable fillers are the milled fiber, the glass fiber and the carbon fiber. These fibers treated with an epoxy-, amino- or urethane-based silane coupling agent are preferably used.

Examples of the pigment include titanium oxide, zinc sulfide and zinc oxide.

Typical examples of the lubricant include a mineral oil, a silicone oil, an ethylene wax, a polypropylene wax, metal stearates such as sodium stearate and lithium stearate, metal montanates such as sodium montanate, lithium montanate and zinc montanate, montanic acid amide and montanic acid ester.

Examples of the flame retardant include phosphoric acid esters such as triphenyl phosphate and tricresyl phosphate; brominated compounds such as decabromobiphenyl, pentabromotoluene, decabromobiphenyl ether, hexabromobenzene, brominated polystyrene, a brominated epoxy resin and a brominated phenoxy resin; nitrogen-containing compounds such as melamine derivatives; and nitrogen-containing phosphorus compounds such as a cyclic phosphagen compound and a phosphagen polymer.

The flame retardant aid may be used. Examples of the flame retardant aid include compounds of antimony, boron, zinc and iron.

Other additives include a stabilizer such as a phenol having steric hindrance or a phosphite compound; and an ultraviolet absorber such as an oxalic acid diamide compound or an amine compound having steric hindrance.

Examples of the other resin that can be mixed include epoxy resins and phenoxy resins produced from epichlorohydrin and a dihydric phenol such as 2,2-bis(4-hydroxyphenyl)propane; aliphatic and aromatic crystalline polyamides such as nylon-6, nylon-10, nylon-12, nylon-6,6, nylon-MXD,6, nylon 4,6, nylon-6,T and nylon-6,I; aliphatic and aromatic noncrystalline polyamides; polycarbonates produced by reacting at least one dihydric phenol selected from hydroquinone, resorcin, 4,4'-dihydroxydiphenyl, bis(4-hydroxyphenyl)methane, 2,2-bis(4-hydroxyphenyl)propane, 1,1-bis(4-hydroxyphenyl)cyclohexane, bis(4-hydroxyphenyl) ether, bis(4-hydroxyphenyl)sulfone, bis(4-hydroxyphenyl) sulfide, bis(4-hydroxyphenyl) ketone and 4-hydroxyphenyl-3-hydroxyphenyl ketone with phosgene, diphenyl carbonate or dimethyl carbonate; polyester carbonates produced by the reaction of a dihydric phenol with phosgene, diphenyl carbonate or dimethyl carbonate and a dicarboxylic acid or its derivatives; polyphenylene ether obtained by oxidation and coupling polymerization of 2,6-dimethylphenol; and aromatic resins such as polysulfone, polyether sulfone, polyether imide, polythioether ketone, polyether ketone and polyether ether ketone.

Examples of the elastomer include a polyester elastomer typified by a block copolymer of a high-melting hard segment composed mainly of an alkylene terephthalate unit comprising the above dihydric alcohol and terephthalic acid and a soft segment composed of an aliphatic polyester produced from polyether glycol such as poly(ethylene oxide) glycol or poly(propylene oxide) glycol or an aliphatic dicarboxylic acid and a dihydric alcohol (its typical products are PELPRENE made by Toyobo Co., Ltd., and HYTREL made by E. I. du Pont de Nemours & Co.); a polyamide elastomer typified by a block copolymer of a hard segment such as nylon 11 or nylon 12 and a soft segment such as a polyether or a polyester (its typical product is GRILAMID made by EMS CHEMIE); low-density, high-density, ultra-high-molecular-weight and linear low-density polyethylenes; polypropylene; an EP elastomer which is a copolymer of ethylene and propylene; an EPDM elastomer which is a copolymer of ethylene, propylene and a non-conjugated diene such as rbornene, cyclopentadiene or 1,4-hexadiene; a copolymer elastomer of an α-olefin such as ethylene, propylene or butene-1 and an α,β-unsaturated acid glycidyl ester such as glycidyl acrylate or glycidyl methacrylate; a copolymer elastomer of an α-olefin such as ethylene, propylene or butene-1 and an unsaturated ester such as vinyl acetate, vinyl propionate, methyl acrylate or methyl methacrylate; the above polyethylene, polypropylene, EP, EPDM and α-olefin copolymer elastomer which are graft-modified with an α,β-unsaturated dicarboxylic acid anhydride such as maleic anhydride or an α,β-unsaturated acid glycidyl ester such as glycidyl methacrylate; an A-B-A, A-B type elastomeric block copolymer comprising a block A composed of a polymer chain of a vinyl aromatic compound such as styrene and a block B composed of a polymer chain of a diene component such as butadiene or isoprene; an A-B-A, A-B type elastomeric block copolymer obtained by hydrogenating the block B, an A-B-A, A-B type elastomeric block copolymer graft-modified with an α,β-unsaturated dicarboxylic acid anhydride such as maleic anhydride or an α,β-unsaturated acid glycidyl ester such as glycidyl methacrylate, and an A-B-A, A-B type elastomeric block copolymer obtained by the same graft-modification and hydrogenation of the block B; and a polysulfide rubber and a silicone rubber.

The resin composition of this invention which has been detailed above has a good balance of a flowability, a heat resistance and mechanical strengths even if the resin composition is a combination of the aromatic copolyamideimide (A) and the polyester resin (B), a combination of the polymer (A) and the polyphenylene sulfide resin (B), or a combination of the polymer (A) and the resin (D) capable of forming the anisotropic molten phase.

That is, although a heat resistance and mechanical strengths inherent in the aromatic copolyamideimide (A) are somewhat sacrificed, a flowability which the resin (A) essentially lacks is improved by mixing with the other resin, making the resin (A) melt-moldable. In consequence, the resin composition of this invention has a good balance among the properties, and can suitably be applied to usages requiring a heat resistance, such as electrical and electronic parts, parts of automobile engines and the like.

Especially, it can be mentioned that the resin composition of this invention has an excellent heat resistance although the amount of the imide structure contained in the aromatic copolyamideimide (A) used in this invention is small.

Moreover, the resin composition composed of the aromatic polyamideimide resin (A) and the liquid crystal polymer (D) can be a resin composition having an excellent flexural modulus by mixing a small amount of the liquid crystal polymer, and is expected to be used in electronic parts such as a relay, a connector, etc. and parts of automobile engines.

This invention will be specifically illustrated by the following Examples.

Examples of a resin composition using a polyester resin (B)

SYNTHESIS EXAMPLE 1

Three (3) liters of N-methylpyrrolidone having a water content of 15 ppm were charged into a 5-liter reactor equipped with a stirrer, a thermometer and a reflux condenser having a drying tube whose top was filled with calcium chloride. To this were added 155.5 g (14 mol % based on the total molar amount of all the monomer components) of trimellitic anhydride, 304.1 g (36 mol % on the same basis) of adipic acid, and then 503.3 g (50 mol % on the same basis) of 2,4-toluylene diisocyanate. When trimellitic anhydride and adipic acid were added, the water content in the reaction system was 30 ppm. First, the temperature of the contents was elevated from room temperature to 100° C. over a period of 20 minutes, and the polymerization was conducted at this temperature for 4 hours. Then, the temperature was elevated to 115° C. over a period of 15 minutes. While this temperature was maintained, the polymerization was continued for 4 hours, and further conducted at 160° C. for 2 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, separated by filtration, and dried under reduced pressure at 200° C. for 10 hours to obtain a polyamideimide powder. A reduced viscosity of the polyamideimide powder was measured in a dimethylformamide solution (concentration 10 g/dl) at 30° C., and then found to be 0.38 dl/g. Further, a glass transition temperature of the polyamideimide powder was measured by differential scanning calorimetry (DSC) method. The results are shown in Table 1 together with the results of other Synthesis Examples.

SYNTHESIS EXAMPLE 2

Three (3) liters of N-methylpyrrolidone having a water content of 15 ppm were charged into a 5-liter reactor equipped with a stirrer, a thermometer and a reflux condenser having a drying tube whose top was filled with calcium chloride. Trimellitic anhydride (222.1 g: 20 mol % based on the total molar amount of all the monomer components) and 253.2 g (30 mol % on the same basis) of adipic acid were charged into a 5-liter reactor equipped with a stirrer, a thermometer and a drying tube whose top was filled with calcium chloride. Then, 503.3 g (50 mol % on the same basis) of 2,4-toluylene diisocyanate was added. Subsequently, in the same manner as in Synthesis Example 1, the polymerization and the treatment were conducted to obtain a polyamideimide powder. A reduced viscosity of the polyamideimide powder was measured in a dimethylformamide solution (concentration 1.0 g/dl) at 30° C., and then found to be 0.36 dl/g.

SYNTHESIS EXAMPLE 3

Three (3) liters of N-methylpyrrolidone having a water content of 15 ppm was charged into the same reactor as that used in Synthesis Example 1. To this were added 333.1 g (30 mol % based on the total molar amount of all the monomer components) of trimellitic anhydride, 168.9 g (20 mol % on the same basis) of adipic acid and 503.3 g (50 mol % on the same basis) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and then found to be 0.33 dl/g.

SYNTHESIS EXAMPLE 4

Three (3) liters of N-methylpyrrolidone having a water content of 15 ppm were charged in the same reactor as that used in Synthesis Example 1. To this were added 444.2 g (40 mol % based on the total molar amount of all the monomer components) of trimellitic anhydride, 84.4 g (10 mol % on the same basis) of adipic acid and then 503.3 g (50 mol % on the same basis) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and then found to be 0.32 dl/g.

SYNTHESIS EXAMPLE 5

Three (3) liters of N-methylpyrrolidone having a water content of 15 ppm were charged in the same reactor as that used in Synthesis Example 1. To this were added 555.3 g (50 mol % based on the total molar amount of all the monomer components) of trimellitic anhydride and then 503.3 g (50 mol % on the same basis) of 2,4-toluylene diisocyanate. When trimellitic anhydride was added, the water content in the reaction system was 25 ppm. Subsequently, the polymerization and the treatment were conducted in the same manner as in Synthesis Example 1 to obtain a polyamide-imide powder. A reduced viscosity of the polyamideimide powder was measured in a dimethylformamide solution (concentration 1.0 g/dl) at 30° C., and then found to be 0.30 dl/g.

SYNTHESIS EXAMPLE 6

Three (3) liters of N-methylpyrrolidone having a water content of 15 ppm were charged into the same reactor as that used in Synthesis Example 1. To this were added 422.3 g (50 mol % based on the total molar amount of all the monomer components) of adipic acid and then 503.3 g (50 mol % on the same basis) of 2,4-toluylene diisocyanate. When adipic acid was added, the water content in the reaction system was 50 ppm. Subsequently, the polymerization and the treatment were conducted in the same manner as in Synthesis Example 1 to obtain a polyamideimide powder. A reduced viscosity of the polyamideimide powder was measured in a dimethyl-formamide solution (concentration 1.0 g/dl) at 30° C., and then found to be 0.35 dl/g.

The compositions and the properties of the polymers synthesized in Synthesis Examples 1 to 6 are shown in Table 1.

EXAMPLE 1

Fifty (50) percent by weight of the aromatic copolyamideimide produced in Synthesis Example 1 and 50 by weight of polybutylene terephthalate (hereinafter abbreviated as "PBT", N1100C: a trade name for a product made by Mitsubishi Rayon Company Limited) were melt-kneaded at 280° C. and pelletized with a twin-screw extruder. The resulting pellets were injection molded to form test pieces having a thickness of ⅛ inch. The test pieces were measured for a heat deformation temperature at a stress of 18.6 kg/cm² to evaluate a heat resistance and for a flexural strength to evaluate a mechanical strength.

Further, regarding a melt moldability, a melt flow value was measured at 270° C. under a stress of 30 kg/cm² by a Koka type flow tester (capillary rheometer). The results are shown in Table 2.

EXAMPLES 2 TO 4

Example 1 was repeated except that the aromatic copolyamideimide in Example 1 was replaced with the aromatic copolyamideimides in Synthesis Examples 2 to 4. The results are shown in Table 2.

COMPARATIVE EXAMPLES 1 AND 2

Example 1 was repeated except that the aromatic copolyamideimide in Example 1 was replaced with the aromatic copolyamideimides or the aromatic polyamides in Synthesis Examples 5 and 6. The results are shown in Table 2.

EXAMPLE 5

Forty (40) percent by weight of the aromatic copolyamideimide produced in Synthesis Example 2, 50% by weight of PBT and 10% by weight of bisphenol A polycarbonate (hereinafter abbreviated as "PC"; IUPILON E2000, a trade name for a product made by Mitsubishi Gas Chemical Company., Inc.) were melt-kneaded at 280° C. and pelletized with a twin-screw extruder. The obtained pellets were injection-molded to form test pieces having a thickness of ⅛ inch. The test pieces were measured for a heat deformation temperature at a stress of 18.6 kg/cm² to evaluate a heat resistance and for a flexural strength to evaluate a mechanical strength.

Further, regarding a melt moldability, a melt flow value was measured at 270° C. under a stress of 60 kg/cm² by a capillary rheometer. The results are shown in Table 3.

COMPARATIVE EXAMPLE 3

Example 5 was repeated except that the aromatic copolyamideimide in Example 5 was replaced with the aromatic copolyamideimide in Synthesis Example 5. The results are shown in Table 3.

EXAMPLE 6

Twenty (20) percent by weight of the aromatic copolyamideimide produced in Synthesis Example 2, 30% by weight of polyethylene terephthalate (hereinafter abbreviated as "PET"; RT543, a trade name for a product made by Nippon Unipet Co., Ltd.), 10% by weight of PC and further 40% by weight of glass fibers (hereinafter referred to as "glass fibers" or "GF"; 03JAFT540, a trade name for chopped strands made by Asahi Fiber Glass Co., Ltd) were melt-kneaded at 280° C. and pelletized with a twin-screw extruder. The obtained pellets were injection-molded in the same manner as in Example 5 to form test pieces. The test pieces were measured for a heat deformation temperature, a flexural strength and further a melt flow value in the same manner as in Example 5. The results are shown in Table 3.

COMPARATIVE EXAMPLE 4

Example 6 was repeated except that the aromatic copolyamideimide in Example 6 was replaced with the aromatic copolyamideimide in Synthesis Example 5. The results are shown in Table 3.

EXAMPLE 7

Thirty (30) percent by weight of the aromatic copolyamideimide produced in Synthesis Example 2, 30% by weight of PBT and 40% by weight of glass fibers were melt-kneaded at 280° C. and pelletized with a twin-screw extruder. The obtained pellets were injection-molded in the same manner as in Example 5 to form test pieces. The test pieces were measured for a heat deformation temperature, a flexural strength and further a melt flow value in the same manner as in Example 5. The results are shown in Table 3.

COMPARATIVE EXAMPLE 5

Example 7 was repeated except that the aromatic copolyamideimide in Example 7 was replaced with the aromatic copolyamideimide in Synthesis Example 5. The results are shown in Table 3.

EXAMPLE 8

Example 7 was repeated except that PBT in Example 7 was replaced with PET. The results are shown in Table 3.

EXAMPLE 9

Example 8 was repeated except that the aromatic copolyamideimide in Example 8 was replaced with the aromatic copolyamideimide in Synthesis Example 1. The results are shown in Table 3.

COMPARATIVE EXAMPLE 6

Example 9 was repeated except that the aromatic copolyamideimide in Example 9 was replaced with the aromatic copolyamideimide in Synthesis Example 5. The results are shown in Table 3.

TABLE 1

| Synthesis Example | Composition of acid component | | Diisocyanate | Glass transition point (°C.) |
|---|---|---|---|---|
| | TMA (mole %) | ADA (mole %) | TDI (mole %) | |
| 1 | 14 | 36 | 50 | 170 |
| 2 | 20 | 30 | 50 | 180 |
| 3 | 30 | 20 | 50 | 220 |
| 4 | 40 | 10 | 50 | 285 |
| 5 | 50 | 0 | 50 | 326 |
| 6 | 0 | 50 | 50 | 155 |

TMA; trimellitic anhydride
ADA; adipic acid
TDI; 2,4-toluylene diisocyanate

TABLE 2

| | Kind of amideimide (wt. %) | Kind of polyester (wt. %) | Heat deformation temp. (°C.) | Flexural strength (MPa) | Melt-flow value (cc/sec) |
|---|---|---|---|---|---|
| Ex. 1 | Synthesis Example 1 50 | PBT 50 | 178 | 87 | 0.07 |
| Ex. 2 | Synthesis Example 2 50 | PBT 50 | 186 | 84 | 0.08 |
| Ex. 3 | Synthesis Example 3 50 | PBT 50 | 180 | 80 | 0.10 |
| Ex. 4 | Synthesis Example 4 50 | PBT 50 | 180 | 75 | 0.11 |
| Comp. Ex. 1 | Synthesis Example 5 50 | PBT 50 | 180 | 48 | 0.13 |
| Comp. Ex. 2 | Synthesis Examle 6 50 | PBT 50 | 159 | 43 | 0.11 |

TABLE 3

| | Kind of amideimide (wt. %) | Kind of other component(s) | Kind of polyester component | Heat deformation temp. (°C.) | Flexural strength (MPa) | Melt-flow value (cc/sec) |
|---|---|---|---|---|---|---|
| Ex. 5 | Synthesis Example 2 40 | PBT 50 | PC 10 | 167 | 90 | 0.22 |
| Ex. 6 | Synthesis Example 2 20 | PET 30 | PC/GF 10/40 | 210 | 168 | 0.24 |
| Ex. 7 | Synthesis Example 2 30 | PBT 30 | GF 40 | 208 | 147 | 0.20 |
| Ex. 8 | Synthesis Example 2 30 | PET 30 | GF 40 | 220 | 170 | 0.31 |
| Ex. 9 | Synthesis Example 1 30 | PET 30 | GF 40 | 220 | 172 | 0.30 |
| Comp. Ex. 3 | Synthesis Example 5 40 | PBT 50 | PC 10 | 163 | 58 | 0.22 |
| Comp. Ex. 4 | Synthesis Example 5 20 | PET 30 | PC/GF 10/40 | 203 | 130 | 0.25 |
| Comp. Ex. 5 | Synthesis Example 5 30 | PBT 30 | GF 40 | 205 | 120 | 0.19 |
| Comp. Ex. 6 | Synthesis Example 5 30 | PET 30 | GF 40 | 210 | 140 | 0.32 |

SYNTHESIS EXAMPLE 11

Three (3) liters of N-methylpyrrolidone having a water content of 15 ppm were charged into a 5-liter reactor equipped with a stirrer, a thermometer and a reflux condenser having a drying tube whose top was filled with calcium chloride. To this were added 155.5 g (14 mol % based on the total molar amount of all the monomer components) of trimellitic anhydride, 345.7 g (36 mol % on the same basis) of isophthalic acid and then 503.3 g (50 mol % on the same basis) of 2,4-toluylene diisocyanate. When trimellitic anhydride and isophthalic acid were added, the water content in the reaction system was 30 ppm. First, the temperature of the contents was elevated from room temperature to 100° C. over a period of 20 minutes, and the polymerization was conducted at this temperature for 4 hours. Then, the temperature was elevated to 115° C. over a period of 15 minutes. While this temperature was maintained, the polymerization was continued for 4 hours, and further conducted at 160° C. for 2 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and then found to be 0.42 dl/g. Further, a glass transition temperature of the polyamideimide powder was measured by differential scanning calorimetry (DSC) method. The results are shown in Table 1 together with the results of other Synthesis Examples.

SYNTHESIS EXAMPLE 12

Three (3) liters of N-methylpyrrolidone having a water content of 15 ppm were charged into a 5-liter reactor equipped with a stirrer, a thermometer and a reflux condenser having a drying tube whose top was filled with calcium chloride. Trimellitic anhydride (222.1 g: 20 mol % based on the total molar amount of all the monomer components) and 288.1 g (30 mol % on the same basis) of isophthalic acid were charged into a 5-liter reactor equipped with a stirrer, a thermometer and a reflux condenser having a drying tube whose top was filled with calcium chloride. Then, 503.3 g (50 mol % on the same basis) of 2,4-toluylene diisocyanate was added. Subsequently, in the same manner as in Synthesis Example 1, the polymerization and the treatment were conducted to obtain a polyamideimide powder. A reduced viscosity of the polyamideimide powder was measured in a dimethylformamide solution (concentration 1.0 g/dl) at 30° C., and then found to be 0.40 dl/g.

SYNTHESIS EXAMPLE 13

Three (3) liters of N-methylpyrrolidone having a water content of 20 ppm were charged into the same reactor as that used in Synthesis Example 11. To this were added 210.6 g (20 mol % based on the total molar amount of all the monomer components) of anhydrous trimellitic acid chloride, 304.5 g (30 mol % on the same basis) of isophthalic acid chloride and then 305.4 g (50 mol % on the same basis) of m-toluylenediamine. Subsequently, the polymerization and the treatment were conducted in the same manner as in Synthesis Example 11 to obtain a polyamideimide powder. The resulting polyamideimide powder was heat-treated at 250° C. for 24 hours. A reduced viscosity of the polyamideimide powder was measured in a dimethylformamide solution (concentration 1.0 g/dl) at 30° C., and then found to be 0.26 dl/g.

SYNTHESIS EXAMPLE 14

Three (3) liters of N-methylpyrrolidone having a water content of 15 ppm were charged into the same reactor as that used in Synthesis Example 11. To this were added 333.1 g (30 mol % based on the total molar amount of all the monomer components) of trimellitic anhydride, 192.0 g (20 mol % on the same basis) of isophthalic acid and then 503.3 g (50 mol % on the same basis) of 2,4-toluylene diisocyanate. Subsequently, the polymerization and the treatment were conducted in the same manner as in Synthesis Example 11 to obtain a polyamideimide powder. A reduced viscosity of the polyamideimide powder was measured in a dimethylformamide solution (concentration 1.0 g/dl) at 30° C., and then found to be 0.33 d/g.

SYNTHESIS EXAMPLE 15

Three (3) liters of N-methylpyrrolidone having a water content of 15 ppm were charged into the same reactor as that used in Synthesis Example 1. To this were added 444.2 g (40 mol % based on the total molar amount of all the monomer components) of trimellitic anhydride, 96.0 g (10 mol % on the same basis) of isophthalic acid and then 503.3 g (50 mol % on the same basis) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and then found to be 0.32 d/g.

SYNTHESIS EXAMPLE 16

Three (3) liters of N-methylpyrrolidone having a water content of 15 ppm were charged into the same reactor as that used in Synthesis Example 11. To this were added 555.3 g (50 mol % based on the total molar amount of all the monomer components) of trimellitic anhydride and then 503.3 g (50 mol % on the same basis) of 2,4-toluylene diisocyanate. When trimellitic anhydride was added, the water content in the reaction system was 25 ppm. Subsequently, the polymerization and the treatment were conducted in the same manner as in Synthesis Example 11 to obtain a polyamideimide powder. A reduced viscosity of the polyamideimide powder was measured in a dimethylformamide solution (concentration 1.0 g/dl) at 30° C., and then found to be 0.30 dl/g.

SYNTHESIS EXAMPLE 17

Three (3) liters of N-methylpyrrolidone having a water content of 15 ppm were charged into the same reactor as that used in Synthesis Example 11. To this were added 480.1 g (50 mol % based on the total molar amount of all the monomer components) of isophthalic acid and then 503.3 g (50 mol % on the same basis) of 2,4-toluylene diisocyanate. The water content in the reaction system was 50 ppm. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and then found to be 0.30 dl/g.

The compositions and the properties of the polymers formed in Synthesis Examples 11 to 17 are shown in Table 4.

EXAMPLE 11

Fifty (50) percent by weight of the aromatic copolyamideimide produced in Synthesis Example 11 and 50% by weight of PBT were melt-kneaded at 280° C. and pelletized with a twin-screw extruder. The resulting pellets were injection-molded to form test pieces having a thickness of ⅛ inch. The test pieces were measured for a heat deformation temperature at a stress of 18.6 kg/cm$^2$ to evaluate a heat resistance and for a flexural strength to evaluate a mechanical strength.

Further, regarding a melt moldability, a melt flow value was measured at 270° C. under a stress of 30 kg/cm$^2$ by a capillary rheometer. The results are shown in Table 5.

EXAMPLES 12 TO 15

Example 11 was repeated except that the aromatic copolyamideimide in Example 11 was replaced with the aromatic copolyamideimides in Synthesis Examples 12 to 15. The results are shown in Table 5.

COMPARATIVE EXAMPLES 11 AND 12

Example 11 was repeated except that the aromatic copolyamideimide in Example 11 was replaced with the aromatic copolyamideimides or the aromatic polyamides in Synthesis Examples 16 and 17. The results are shown in Table 5.

EXAMPLE 16

Forty (40) percent by weight of the aromatic copolyamideimide produced in Synthesis Example 12, 50% by weight of PBT and 10% by weight of PC were melt-kneaded at 280° C. and pelletized with a twin-screw extruder. The resulting pellets were injection-molded to form test pieces having a thickness of ⅛ inch. The test pieces were measured for a heat deformation temperature at a stress of 18.6 kg/cm$^2$ to evaluate a heat resistance and for a flexural strength to evaluate a mechanical strength.

Further, regarding a melt moldability, a melt flow value was measured at 270° C. under a stress of 60 kg/cm$^2$ by a capillary rheometer. The results are shown in Table 6.

COMPARATIVE EXAMPLE 13

Example 16 was repeated except that the aromatic copolyamideimide in Example 16 was replaced with the aromatic copolyamideimide in Synthesis Example 16. The results are shown in Table 6.

EXAMPLE 17

Twenty (20) percent by weight of the aromatic copolyamideimide produced in Synthesis Example 12, 30% by weight of PET, 10% by weight of PC and 40% by weight of glass fibers were melt-kneaded at 280° C. and pelletized with a twin-screw extruder. The resulting pellets were injection-molded in the same manner as in Example 16 to form test pieces. The test pieces were measured for a heat deformation temperature, a flexural strength and further a melt flow value in the same manner as in Example 16. The results are shown in Table 6.

COMPARATIVE EXAMPLE 14

Example 17 was repeated except that the aromatic copolyamideimide in Example 17 was replaced with the aromatic copolyamideimide in Synthesis Example 16. The results are shown in Table 6.

EXAMPLE 18

Thirty (30) percent by weight of the aromatic copolyamideimide produced in Synthesis Example 12, 30% by weight of PBT and 40% by weight of glass fibers were melt-kneaded at 280° C. and pelletized with a twin-screw extruder. The resulting pellets were injection-molded in the same manner as in Example 16 to form test pieces. The test pieces were measured for a heat deformation temperature, a flexural strength and further a melt flow value in the same manner as in Example 16. The results are shown in Table 6.

COMPARATIVE EXAMPLE 15

Example 18 was repeated except that the aromatic copolyamideimide in Example 18 was replaced with the aromatic copolyamideimide in Synthesis Example 16. The results are shown in Table 6.

EXAMPLE 19

Example 18 was repeated except that PBT in Example 18 was replaced with PET. The results are shown in Table 6.

COMPARATIVE EXAMPLE 16

Example 19 was repeated except that the aromatic copolyamideimide in Example 19 was replaced with the aromatic copolyamideimide in Synthesis Example 16. The results are shown in Table 6.

TABLE 4

| Synthesis Example | Composition of acid components TMA/IPA (mole %) (mole %) | Diisocyanate TDI (mole %) | Glass transition point (°C.) |
|---|---|---|---|
| 11 | 14/36 | 50 | 273 |
| 12 | 20/30 | 50 | 290 |
| 13 | (acid chloride) (20/30) | (m-TDA) (50) | 290 |
| 14 | 30/20 | 50 | 305 |
| 15 | 40/10 | 50 | 310 |
| 16 | 50/0 | 50 | 326 |
| 17 | 0/50 | 50 | 260 |

TMA; trimellitic anhydride
IPA; isophthalic acid
TDI; 2,4-toluylene diisocyanate
m-TDA; m-toluylenediamine
acid chloride; anhydrous trimellitic acid chloride/isophthalic acid dichloride

TABLE 5

| | Kind of amide-imide (wt. %) | Kind of polyester (wt. %) | Heat deformation temp. (°C.) | Flexural strength (MPa) | Melt-flow value (cc/sec) |
|---|---|---|---|---|---|
| Ex. 11 | Synthesis Example 11 50 | PBT 50 | 197 | 93 | 0.09 |
| Ex. 12 | Synthesis Example 12 50 | PBT 50 | 200 | 91 | 0.10 |

TABLE 5-continued

|  | Kind of amide-imide (wt. %) | Kind of polyester (wt. %) | Heat deformation temp. (°C.) | Flexural strength (MPa) | Melt-flow value (cc/sec) |
| --- | --- | --- | --- | --- | --- |
| Ex. 13 | Synthesis Example 13 50 | PBT 50 | 200 | 90 | 0.12 |
| Ex. 14 | Synthesis Example 14 50 | PBT 50 | 182 | 78 | 0.11 |
| Ex. 15 | Synthesis Example 15 50 | PBT 50 | 182 | 65 | 0.10 |
| Comp. Ex. 11 | Synthesis Example 16 50 | PBT 50 | 180 | 48 | 0.13 |
| Comp. Ex. 12 | Synthesis Example 17 50 | PBT 50 | 192 | 43 | 0.11 |

TABLE 6

|  | Kind of amide-imide (wt. %) | Kind of other component(s) (wt. %) | Kind of polyester (wt. %) | Heat deformation temp. (°C.) | Flexural strength (MPa) | Melt-flow value (cc/sec) |
| --- | --- | --- | --- | --- | --- | --- |
| Ex. 15 | Synthesis Example 12 40 | PBT 50 | PC 10 | 167 | 90 | 0.22 |
| Ex. 16 | Synthesis Example 12 20 | PET 30 | PC/GF 10/40 | 210 | 168 | 0.24 |
| Ex. 17 | Synthesis Example 12 30 | PBT 30 | GF 40 | 208 | 147 | 0.20 |
| Ex. 18 | Synthesis Example 12 30 | PET 30 | GF 40 | 220 | 170 | 0.31 |
| Ex. 19 | Synthesis Example 11 30 | PET 30 | GF 40 | 220 | 172 | 0.30 |
| Comp. Ex. 13 | Synthesis Example 15 40 | PBT 50 | PC 10 | 163 | 58 | 0.22 |
| Comp. Ex. 14 | Synthesis Example 15 20 | PET 30 | PC/GF 10/40 | 203 | 130 | 0.25 |
| Comp. Ex. 15 | Synthesis Example 15 30 | PBT 30 | GF 40 | 205 | 120 | 0.19 |
| Comp. Ex. 16 | Synthesis Example 15 30 | PET 30 | GF 40 | 210 | 140 | 0.32 |

SYNTHESIS EXAMPLE 21

Three (3) liters of N-methylpyrrolidone having a water content of 15 ppm were charged into a 5-liter reactor equipped with a stirrer, a thermometer and a reflux condenser having a drying tube whose top was filled with calcium chloride. To this were added 222.1 g (20 mol % based on the total molar amount of all the monomer components) of trimellitic anhydride, 240.1 g (25 mol % on the same basis) of isophthalic acid, 42.2 g (5 mol % on the same basis) of adipic acid and then 503.3 g (50 mol % on the same basis) of 2,4-toluylene diisocyanate. When trimellitic anhydride, isophthalic acid and adipic acid were added, the water content in the reaction system was 30 ppm. First, the temperature of the contents was elevated from room temperature to 100° C. over a period of 20 minutes, and polymerization was conducted at this temperature for 4 hours. Subsequently, the temperature was elevated to 115° C. over a period of 15 minutes. While maintaining this temperature, the polymerization was continued for 4 hours, and further conducted at 160° C. for 2 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, then separated by filtration and dried under reduced pressure at 200° C. for 10 hours to obtain a polyamideimide powder. A reduced viscosity of the polyamideimide powder was measured in a dimethylformamide solution (concentration 1.0 g/dl) at 30° C., and then found to be 0.43 dl/g. A glass transition temperature of the polyamideimide powder was measured by differential scanning calorimetry (DSC) method. The results are shown in Table 7 together with those in other Synthesis Examples.

SYNTHESIS EXAMPLE 22

Three (3) liters of N-methylpyrrolidone having a water content of 20 ppm were charged into a 5-liter reactor equipped with a stirrer, a thermometer and a reflux condenser having a drying tube whose top was filled with calcium chloride. Anhydrous trimellitic acid chloride (210.6 g: 20 mol % based on the total molar amount of all the monomer components), 253.8 g (25 mol % on the same basis) of isophthalic acid dichloride and 45.8 g (5 mol % on the same basis) of adipic acid dichloride were charged into a 5-liter reactor equipped with a stirrer, a thermometer and a reflux condenser having a drying tube whose top was filled with calcium chloride. Then, 305.4 g (50 mol % on the same basis) of m-toluylenediamine was added. First, the polymerization was conducted from room temperature to 40° C. for 15 hours. Thereafter, the temperature was elevated to 150° C. While maintaining this temperature, the polymerization was continued for 7 hours. After the polymerization was over, the polymer solution was double diluted with the addition of N-methylpyrrolidone, and the diluted solution was added to methanol in a volume which was twice that of N-methylpyrrolidone under vigorous stirring. The precipitated polymer was separated by suction filtration, further redispersed in methanol for full washing, then separated by filtration and dried under reduced pressure at 200° C. to obtain a polyamideimide powder. The obtained polyamideimide powder was heat-treated at 250° C. for 24 hours. A reduced viscosity of the resulting polyamideimide powder was measured in a dimethylformamide solution (concentration 1.0 g/dl) at 30° C., and then found to be 0.28 dl/g.

SYNTHESIS EXAMPLE 23

Three (3) liters of N-methylpyrrolidone having a water content of 15 ppm were charged into the same reactor as that used in Synthesis Example 21. To this were added 222.1 g (20 mol % based on the total molar amount of all the monomer components) of trimellitic anhydride, 192.1 g (20 mol % on the same basis) of isophthalic acid, 84.4 g (10 mol % on the same basis) of adipic acid and then 503.3 g (50 mol % on the same basis) of 2,4-toluylene diisocyanate. Subsequently, the polymerization and the treatment were conducted in the same manner as in Synthesis Example 21 to obtain a polyamideimide powder. A reduced viscosity of the polyamideimide powder was measured in a dimethylformamide solution (concentration 1.0 g/dl) at 30° C., and then found to be 0.40 dl/g.

SYNTHESIS EXAMPLE 24

Three (3) liters of N-methylpyrrolidone having a water content of 15 ppm were charged into the same reactor as that used in Synthesis Example 21. To this were added 222.1 g (20 mol % based on the total molar amount of all the monomer components) of trimellitic anhydride, 96.0 g (10 mol % on the same basis) of isophthalic acid, 168.9 g (20 mol % on the same basis) of adipic acid and then 503.3 g (50 mol % on the same basis) of 2,4-toluylene diisocyanate. Subsequently, the polymerization and the treatment were conducted in the same manner as in Synthesis Example 21 to obtain a polyamideimide powder. A reduced viscosity of the polyamideimide powder was measured in a dimethylformamide solution (concentration 1.0 g/dl) at 30° C., and then found to be 0.36 dl/g.

SYNTHESIS EXAMPLE 25

Three (3) liters of N-methylpyrrolidone having a water content of 15 ppm were charged into the same reactor as that used in Synthesis Example 21. To this were added 138.8 g (12.5 mol % based on the total molar amount of all the monomer components) of trimellitic anhydride, 288.1 g (30 mol % on the same basis) of isophthalic acid, 63.3 g (7.5 mol % on the same basis) of adipic acid and then 503.3 g (50 mol % on the same basis) of 2,4-toluylene diisocyanate. Subsequently, the polymerization and the treatment were conducted in the same manner as in Synthesis Example 21 to obtain a polyamideimide powder. A reduced viscosity of the polyamideimide powder was measured in a dimethylformamide solution (concentration 1.0 g/dl) at 30° C., and then found to be 0.39 dl/g.

SYNTHESIS EXAMPLE 26

Three (3) liters of N-methylpyrrolidone having a water content of 15 ppm were charged into the same reactor as that used in Synthesis Example 21. To this were added 55.3 g (5 mol % based on the total molar amount of all the monomer components) of trimellitic anhydride, 336.1 g (35 mol % on the same basis) of isophthalic acid, 84.4 g (10 mol % on the same basis) of adipic acid and then 503.3 g (50 mol % on the same basis) of 2,4-toluylene diisocyanate. Subsequently, the polymerization and the treatment were conducted in the same manner as in Synthesis Example 21 to obtain a polyamideimide powder. A reduced viscosity of the polyamideimide powder was measured in a dimethylformamide solution (concentration 1.0 g/dl) at 30° C., and then found to be 0.36 dl/g.

SYNTHESIS EXAMPLE 27

Three (3) liters of N-methylpyrrolidone having a water content of 15 ppm were charged into the same reactor as that used in Synthesis Example 21. To this were added 333.1 g (30 mol % based on the total molar amount of all the monomer components) of trimellitic anhydride, 144.0 g (15 mol % on the same basis) of isophthalic acid, 42.2 g (5 mol % on the same basis) of adipic acid and then 503.3 g (50 mol % on the same basis) of 2,4-toluylene diisocyanate. Subsequently, the polymerization and the treatment were conducted in the same manner as in Synthesis Example 21 to obtain a polyamideimide powder. A reduced viscosity of the polyamideimide powder was measured in a dimethylformamide solution (concentration 1.0 g/dl) at 30° C., and then found to be 0.35 dl/g.

SYNTHESIS EXAMPLE 28

Three (3) liters of N-methylpyrrolidone having a water content of 15 ppm were charged into the same reactor as that used in Synthesis Example 21. To this were added 444.2 g (40 mol % based on the total molar amount of all the monomer components) of trimellitic anhydride, 48.0 g (5 mol % on the same basis) of isophthalic acid, 42.2 g (5 mol % on the same basis) of adipic acid and then 503.3 g (50 mol % on the same basis) of 2,4-toluylene diisocyanate. Subsequently, the polymerization and the treatment were conducted in the same manner as in Synthesis Example 21 to obtain a polyamideimide powder. A reduced viscosity of the polyamideimide powder was measured in a dimethylformamide solution (concentration 1.0 g/dl) at 30° C., and then found to be 0.35 dl/g.

SYNTHESIS EXAMPLE 29

Three (3) liters of N-methylpyrrolidone having a water content of 15 ppm were charged in the same reactor as that used in Synthesis Example 21. To this were added 555.3 g (50 mol % based on the total molar amount of all the monomer components) of trimellitic anhydride and then 503.3 g (50 mol % on the same basis) of 2,4-toluylene diisocyanate. When trimellitic anhydride was added, the water content in the reaction system was 25 ppm. First, the temperature of the contents was elevated from room temperature to 90° C. over a period of 20 minutes, and the polymerization was conducted at this temperature for 70 minutes. Subsequently, the temperature was elevated to 115° C. over a period of 15 minutes. While maintaining this temperature, the polymerization was continued for 4 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, then separated by filtration, and dried under reduced pressure at 200° C. for 15 hours to obtain a polyamideimide powder. A reduced viscosity of the polyamideimide powder was measured in a dimethylformamide solution (concentration 1.0 g/dl) at 30° C., and then found to be 0.30 dl/g.

SYNTHESIS EXAMPLE 30

Three (3) liters of N-methylpyrrolidone having a water content of 15 ppm were charged into the same reactor as that used in Synthesis Example 21. To this were added 480.1 g (50 mol % based on the total molar amount of all the monomer components) of isophthalic acid and then 503.3 g (50 mol % on the same basis) of 2,4-toluylene diisocyanate. When isophthalic acid was added, the water content in the reaction system was 50 ppm. Subsequently, the polymerization and the treatment were conducted in the same manner as in Synthesis Example to obtain a polyamideimide powder. A reduced viscosity of the polyamideimide powder was measured in a dimethylformamide solution (concentration 1.0 g/dl) at 30° C., and then found to be 0.30 dl/g.

SYNTHESIS EXAMPLE 31

Three (3) liters of N-methylpyrrolidone having a water content of 15 ppm were charged into the same reactor as that used in Synthesis Example 21. To this were added 422.3 g (50 mol % based on the total molar amount of all the monomer components) of adipic acid and then 503.3 g (50 mol % on the same basis) of 2,4-toluylene diisocyanate. When adipic acid was added, the water content in the reaction system was 50 ppm. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and then found to be 0.35 dl/g.

The compositions and the properties of the polymers formed in said Synthesis Examples 21 to 31 are shown in Table 7.

EXAMPLE 21

Fifty (50) percent by weight of the aromatic copolyamideimide produced in Synthesis Example 21 and 50% by weight of PBT were melt-kneaded at 280° C. and pelletized with a twin-screw extruder. The obtained pellets were injection-molded to form test pieces having a thickness of ⅛ inch. The test pieces were measured for a heat deformation temperature at a stress of 18.6 kg/cm$^2$ to evaluate a heat resistance and for a flexural strength to evaluate a mechanical strength.

Further, regarding a melt moldability, a melt flow value was measured at 270° C. under a stress of 30 kg/cm$^2$ by a capillary rheometer. The results are shown in Table 8.

EXAMPLES 22 TO 28

Example 21 was repeated except that the aromatic copolyamideimide in Example 21 was replaced with the aromatic copolyamideimides in Synthesis Examples 22 to 28. The results are shown in Table 8.

COMPARATIVE EXAMPLES 21 TO 23

Example 21 was repeated except that the aromatic copolyamideimides in Example 21 was replaced with the aromatic copolyamideimide or the aromatic polyamides in Synthesis Examples 29 to 31. The results are shown in Table 8.

EXAMPLE 29

Forty (40) percent by weight of the aromatic copolyamideimide produced in Synthesis Example 23, 50% by weight of PBT and 10% by weight of PC were melt-kneaded at 280° C. and pelletized with a twin-screw extruder to form pellets. The obtained pellets were injection-molded to give test pieces having a thickness of ⅛ inch. The test pieces were measured for a heat deformation temperature at a stress of 18.6 kg/cm$^2$ to evaluate a heat resistance and for a flexural strength to evaluate a mechanical strength.

Further, regarding a melt moldability, a melt flow value was measured at 270° C. under a stress of 60 kg/cm$^2$ by a capillary rheometer. The results are shown in Table 9.

COMPARATIVE EXAMPLE 29

Example 29 was repeated except that the aromatic copolyamideimide in Example 29 was replaced with the aromatic copolyamideimide in Synthesis Example 29. The results are shown in Table 9.

EXAMPLE 30

Twenty (20) percent by weight of the aromatic copolyamideimide produced in Synthesis Example 23, 30% by weight of PET, 10% by weight of PC and further 40% by weight of glass fibers were melt-kneaded at 280° C. and pelletized with a twin-screw extruder. The obtained pellets were injection-molded in the same manner as in Example 29 to form test pieces. The test pieces were measured for a heat deformation temperature, a flexural strength and further a melt flow value in the same manner as in Example 29. The results are shown in Table 9.

COMPARATIVE EXAMPLE 30

Example 30 was repeated except that the aromatic copolyamideimide In Example 30 was replaced with the aromatic copolyamideimide in Synthesis Example 29. The results are shown in Table 9.

EXAMPLE 31

Thirty (30) percent by weight of the aromatic copolyamideimide produced in Synthesis Example 23, 30% by weight of PBT and 40% by weight of glass fibers were melt-kneaded at 280° C. and pelletized with a twin-screw extruder. The obtained pellets were injection-molded in the same manner as in Example 29 to form test pieces. The test pieces were measured for a heat deformation temperature, a flexural strength and further a melt flow value in the same manner as in Example 29. The results are shown in Table 9.

COMPARATIVE EXAMPLE 31

Example 31 was repeated except that the aromatic copolyamideimide in Example 31 was replaced with the aromatic copolyamideimide In Synthesis Example 29. The results are shown in Table 9.

EXAMPLE 32

Example 11 was repeated except that PBT was replaced with PET. The results are shown in Table 9.

EXAMPLES 33 AND 34

Example 32 was repeated except that the aromatic copolyamideimide in Example 32 was replaced with the aromatic copolyamideimides in Synthesis Examples 24 and 25. The results are shown in Table 9.

COMPARATIVE EXAMPLE 32

Example 32 was repeated except that the aromatic copolyamideimide in Example 32 was replaced with the aromatic copolyamideimide in Synthesis Example 29. The results are shown in Table 9.

TABLE 7

| Synthesis Example | Composition of acid components TMA/IPA/ADA (mole %) (mole %) (mole %) | Diisocyanate TDI (mole %) | Glass transition point (°C.) |
|---|---|---|---|
| 21 | 20/25/5 | 50 | 280 |
| 22 | (20/25/5) (acid chloride) | (50) (m-TDA) | 280 |
| 23 | 20/20/10 | 50 | 250 |
| 24 | 20/10/20 | 50 | 230 |
| 25 | 12.5/30/7.5 | 50 | 280 |
| 26 | 5/35/10 | 50 | 280 |
| 27 | 30/15/5 | 50 | 295 |
| 28 | 40/5/5 | 50 | 305 |
| 29 | 50/0/0 | 50 | 326 |
| 30 | 0/50/0 | 50 | 260 |
| 31 | 0/0/50 | 50 | 155 |

TMA; trimellitic anhydride
IPA; isophthalic acid
ADA; adipic acid
TDI; 2,4-toluylene diisocyanate
m-TDA; m-toluylenediamine
acid chloride; anhydrous trimellitic acid chloride/isophthalic acid dichloride/adipic dichloride

TABLE 8

| | Kind of amide-imide (wt. %) | Kind of polyester (wt. %) | Heat deformation temp. (°C.) | Flexural strength (MPa) | Melt-flow value (cc/sec) |
|---|---|---|---|---|---|
| Ex. 21 | Synthesis Example 21 50 | PBT 50 | 200 | 93 | 0.08 |
| Ex. 22 | Synthesis Example 22 50 | PBT 50 | 197 | 100 | 0.09 |
| Ex. 23 | Synthesis Example 23 50 | PBT 50 | 203 | 98 | 0.07 |
| Ex. 24 | Synthesis Example 24 50 | PBT 50 | 200 | 90 | 0.08 |
| Ex. 25 | Synthesis Example 25 50 | PBT 50 | 204 | 98 | 0.10 |
| Ex. 26 | Synthesis Example 26 50 | PBT 50 | 190 | 85 | 0.08 |
| Ex. 27 | Synthesis Example 27 50 | PBT 50 | 184 | 82 | 0.09 |
| Ex. 28 | Synthesis Example 28 50 | PBT 50 | 180 | 73 | 0.09 |
| Comp. Ex. 21 | Synthesis Example 29 50 | PBT 50 | 180 | 48 | 0.13 |
| Comp. Ex. 22 | Synthesis Example 30 50 | PBT 50 | 192 | 43 | 0.11 |
| Comp. Ex. 23 | Synthesis Example 31 50 | PBT 50 | 159 | 38 | 0.09 |

TABLE 9

| | Kind of amide-imide (wt. %) | Kind of other component(s) (wt. %) | Kind of polyester (wt. %) | Heat deformation temp. (°C.) | Flexural strength (MPa) | Melt-flow value (cc/sec) |
|---|---|---|---|---|---|---|
| Ex. 29 | Synthesis Example 23 40 | PBT 50 | PC 10 | 175 | 100 | 0.20 |
| Ex. 30 | Synthesis Example 23 20 | PET 30 | PC/GF 10/40 | 221 | 180 | 0.23 |
| Ex. 31 | Synthesis Example 23 30 | PBT 30 | GF 40 | 220 | 160 | 0.18 |
| Ex. 32 | Synthesis Example 23 30 | PET 30 | GF 40 | 230 | 190 | 0.30 |
| Ex. 33 | Synthesis | PET | GF | 230 | 180 | 0.30 |

TABLE 9-continued

|  | Kind of amide-imide (wt. %) | Kind of other component(s) (wt. %) | Kind of poly-ester (wt. %) | Heat defor-mation temp. (°C.) | Flexural strength (MPa) | Melt-flow value (cc/sec) |
| --- | --- | --- | --- | --- | --- | --- |
|  | Example 24 30 |  | 30 | 40 |  |  |
| Ex. 34 | Synthesis Examle 25 30 | PET 30 | GF 40 | 233 | 180 | 0.30 |
| Comp. Ex. 29 | Synthesis Example 29 40 | PBT 50 | PC 10 | 163 | 84 | 0.22 |
| Comp. Ex. 30 | Synthesis Example 29 20 | PET 30 | PC/GF 10/40 | 203 | 130 | 0.25 |
| Comp. Ex. 31 | Synthesis Example 29 30 | PBT 30 | GF 40 | 205 | 120 | 0.19 |
| Comp. Ex. 32 | Synthesis Example 29 30 | PET 30 | GF 40 | 210 | 140 | 0.32 |

Examples of a resin composition using a polyphenylene sulfide resin (C)

SYNTHESIS EXAMPLE 41

Three (3) liters of N-methylpyrrolidone having a water content of 60 ppm were charged into a 5-liter reactor equipped with a stirrer, a thermometer and a reflux condenser having a drying tube whose top was filled with calcium chloride. To this were added 444.2 g (40 mol % based on the total molar amount of all the monomer components) of trimellitic anhydride, 84.5 g (10 mol % on the same basis) of adipic acid and then 503.3 g (50 mol % on the same basis) of 2,4-toluylene diisocyanate. When trimellitic anhydride and adipic acid were added, the water content in the reaction system was 80 ppm. First, the temperature of the contents was elevated from room temperature to 100° C. over a period of 20 minutes, and the polymerization was conducted at this temperature for 4 hours. Then, the temperature was elevated to 160° C over a period of 15 minutes. While maintaining this temperature, the polymerization was continued for 4 hours. After the polymerization was over, the polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and then found to be 0.32 dl/g. A glass transition temperature of the polyamideimide powder was measured by differential scanning calorimetry (DSC) method. The results are shown in Table 10 together with the results in other Synthesis Examples.

SYNTHESIS EXAMPLE 42

Three (3) liters of N-methylpyrrolidone having a water content of 40 ppm were charged into the same reactor as that used in Synthesis Example 41. To this were added 333.1 g (30 mol % on the basis of the total molar amount of all the monomer components) and 168.8 g (20 mol % on the same basis) of adipic acid. Then, 305.4 g (50 mol % on the same basis) of m-toluylenediamine was added. Subsequently, the polymerization and the treatment were conducted in the same manner as in Synthesis Example 41 to obtain a polyamideimide powder. A reduced viscosity of the polyamideimide powder was measured in a dimethylformamide solution (concentration 1.0 g/dl) at 30° C., and found to be 0.34 dl/g.

SYNTHESIS EXAMPLE 43

Three (3) liters of N-methylpyrrolidone having a water content of 30 ppm were charged into the same reactor as that used in Synthesis Example 41. To this were added 222.1 g (20 mol % on the basis of the total molar amount of all the monomer components) of trimellitic anhydride, 253.2 g (30 mol % on the same basis) of adipic acid and then 503.3 g (50 mol % on the same basis) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and found to be 0.40 dl/g.

SYNTHESIS EXAMPLE 44

Three (3) liters of N-methylpyrrolidone having a water content of 30 ppm were charged into the same reactor as that used in Synthesis Example 41. To this were added 555.3 g (50 mol % based on the total molar amount of all the monomer components) of trimellitic anhydride and then 503.3 g (50 mol % on the same basis) of 2,4-toluylene diisocyanate. When trimellitic anhydride was added, the water content in the reaction system was 25 ppm. First, the temperature of the contents was elevated from room temperature to 90° C. over a period of 20 minutes, and the polymerization was conducted at this temperature for 50 minutes. Then, the temperature was elevated to 115° C. over a period of 15 minutes. While maintaining this temperature, the polymerization was continued for 4 hours. After the polymerization was over, the polymer solution was added dropwise to methanol in a volume which was twice that of N-methylpyrrolidone with vigorous stirring. The precipitated polymer was separated by suction filtration, further redispersed in methanol for full washing, then separated by filtration, and dried at 200° C. for 10 hours to obtain a polyamideimide powder. A reduced viscosity of the polyamideimide powder was measured in a dimethylformamide solution (concentration 1.0 g/dl) at 30° C., and found to be 0.27 dl/g.

SYNTHESIS EXAMPLE 45

Three (3) liters of N-methylpyrrolidone having a water content of 15 ppm were charged into the same reactor as that used in Synthesis Example 41. To this were added 422.3 g (50 mol % based on the total molar amount of all the monomer components) of adipic acid and then 503.3 g (50 mol % on the same basis) of 2,4-toluylene diisocyanate. When adipic acid was added, the water content in the reaction system was 50 ppm. First, the temperature of the contents was elevated from room temperature to 100° C. over a period of 20 minutes, and the polymerization was conducted at this temperature for 70 minutes. Then, the temperature was elevated to 145° C. over a period of 15 minutes. While maintaining this temperature, the polymerization was continued for 4 hours. After the polymerization was over, the polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.35 dl/g.

The results in Synthesis Examples 41 to 45 are shown in Table 10.

EXAMPLE 41

Thirty (30) parts by weight of the aromatic copolyamideimide produced in Synthesis Example 41 and 70 parts by weight of a polyphenylene sulfide resin (hereinafter abbreviated as "PPS"; T-4, a trade name for a product made by Toprene Co., Ltd., a melt viscosity at 300° C. - 2,000 poises) were melt-kneaded at 340° C. and pelletized with a twin-screw extruder. The obtained pellets were injection-molded to form test pieces having a thickness of ¼ inch. The test pieces were measured for a heat deformation temperature at a stress of 18.6 kg/cm$^2$ to evaluate a heat resistance and a flexural strength to evaluate a mechanical strength.

Further, regarding a melt moldability, a melt flow value was measured at 850° C. under a stress of 60 kg/cm$^2$ by a capillary rheometer. The results are shown in Table 10.

EXAMPLES 42 TO 44

Example 41 was repeated except that the mixing ratio was changed. The results are shown in Table 10.

EXAMPLES 45 AND 46

Example 42 was repeated except that the aromatic copolyamideimide in Example 42 was replaced with the aromatic copolyamideimides in Synthesis Examples 42 and 43. The results are shown in Table 10.

COMPARATIVE EXAMPLES 41 TO 46

Examples 41 to 43 were repeated except that the aromatic copolyamideimides in Examples 41 to 43 were replaced with the aromatic copolyamideimides in Synthesis Examples 45 and 46. The results are shown in Table 11.

EXAMPLE 47

Twenty-five (25) parts by weight of the aromatic copolyamideimide produced in Synthesis Example 41, 35 parts by weight of PPS and 40 parts by weight of glass fibers were melt-kneaded at 350° C. and pelletized with a twin-screw extruder. The obtained pellets were injection-molded to form test pieces having a thickness of ¼ inch. The test pieces were measured for a heat deformation temperature at a stress of 18.6 kg/cm$^2$ to evaluate a heat resistance and a flexural modulus at 200° C.

Further, regarding a melt moldability, a melt flow value was measured at 350° C. under a stress of 60 kg/cm$^2$ by a capillary rheometer. The results are shown in Table 12.

EXAMPLES 48 AND 49

Example 7 was repeated except that the aromatic copolyamideimide in Example 7 was replaced with the aromatic copolyamideimides in Synthesis Examples 42 and 43. The results are shown in Table 12.

COMPARATIVE EXAMPLES 47 AND 48

Example 48 was repeated except that the aromatic copolyamideimide in Example 48 was replaced with the aromatic copolyamideimides in Synthesis Examples 44 and 45. The results are shown in Table 13.

TABLE 10

| Synthesis Example | Composition of acid components TMA (mole %) | ADA (mole %) | Diisocyanate TDI (mole %) | Glass transition point (°C.) |
|---|---|---|---|---|
| 41 | 40 | 10 | 50 | 285 |
| 42 | 30 | 20 | 50 | 220 |
| 43 | 20 | 30 | 50 | 180 |
| 44 | 50 | 0 | 50 | 326 |
| 45 | 0 | 50 | 50 | 155 |

TMA; trimellitic anhydride
ADA; adipic acid
TDI; 2,4-toluylene diisocyanate

TABLE 11

| | Kind of amide-imide | PPS (wt. %) | Heat deformation temp. (°C.) | Flexural strength (MPa) | Melt-flow value × 10$^{-1}$ (cc/sec) |
|---|---|---|---|---|---|
| Ex. 41 | Synthesis Example 41 30 | 70 | 156 | 130 | >10 |
| Ex. 42 | Synthesis Example 41 50 | 50 | 222 | 164 | 6.6 |
| Ex. 43 | Synthesis Example 41 70 | 30 | 243 | 160 | 1.2 |
| Ex. 44 | Synthesis Example 41 75 | 25 | 246 | 160 | 1.0 |
| Ex. 45 | Synthesis Example 42 | 50 | 196 | 165 | 7.4 |

TABLE 11-continued

| | Kind of amide-imide (wt. %) | PPS (wt. %) | Heat deformation temp. (°C.) | Flexural strength (MPa) | Melt-flow value × $10^{-1}$ (cc/sec) |
|---|---|---|---|---|---|
| Ex. 46 | 50 Synthesis Example 43 50 | 50 | 175 | 166 | 7.7 |

TABLE 12

| | Kind of amide-imide (wt. %) | PPS (wt. %) | Heat deformation temp. (°C.) | Flexural strength (MPa) | Melt-flow value × $10^{-1}$ (cc/sec) |
|---|---|---|---|---|---|
| Comp. Ex. 41 | Synthesis Example 44 30 | 70 | 170 | 120 | 7.0 |
| Comp. Ex. 42 | Synthesis Example 44 50 | 50 | 230 | 140 | 3.0 |
| Comp. Ex. 43 | Synthesis Example 44 70 | 30 | 248 | 130 | 0.6 |
| Comp. Ex. 44 | Synthesis Example 45 30 | 70 | 107 | 110 | >10 |
| Comp. Ex. 45 | Synthesis Example 45 50 | 50 | 125 | 90 | 6.2 |
| Comp. Ex. 46 | Synthesis Example 45 70 | 30 | 143 | 80 | 1.1 |

TABLE 13

| | Kind of amide-imide (wt. %) | PPS (wt. %) | GF (wt. %) | Heat deformation temp. (°C.) | Flexural modulus (GPa) | Melt-flow value × $10^{-1}$ (cc/sec) |
|---|---|---|---|---|---|---|
| Ex. 47 | Synthesis Example 41 25 | 35 | 40 | 275 | 4.7 | 3.3 |
| Ex. 48 | Synthesis Example 42 25 | 35 | 40 | 265 | 4.4 | 3.5 |
| Ex. 49 | Synthesis Example 43 25 | 35 | 40 | 263 | 3.7 | 3.9 |
| Comp. Ex. 47 | Synthesis Example 44 25 | 35 | 40 | 275 | 5.0 | 0.8 |
| Comp. Ex. 48 | Synthesis Example 45 25 | 35 | 40 | 260 | 2.5 | 2.7 |

Note) Flexural modulus was measured at 200° C.

SYNTHESIS EXAMPLE 51

Three (3) liters of N-methylpyrrolidone having a water content of 40 ppm were charged into a 5-liter reactor equipped with a stirrer, a thermometer and a reflux condenser having a drying tube whose top was filled with calcium chloride. To this were added 222.1 g (20 mol % based on the total molar amount of all the monomer components) of trimellitic anhydride, 288.1 g (30 mol % on the same basis) of isophthalic acid and then 503.3 g (50 mol % on the same basis) of 2,4-toluylene diisocyanate. When trimellitic anhydride and isophthalic acid were added, the water content in the reaction system was 30 ppm. First, the temperature of the contents was elevated from room temperature to 100° C. over a period of 20 minutes, and the polymerization was conducted at this temperature for 4 hours. Then, the temperature was elevated to 160° C. over a period of 15 minutes. While maintaining this temperature, the polymerization was continued for 4 hours. After the polymerization was over, the polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.40 dl/g. A glass transition temperature of the polyamideimide powder was measured by differential scanning calorimetry (DSC) method. The results are shown in Table 14 together with the results in other Synthesis Examples.

SYNTHESIS EXAMPLE 52

Three (3) liters of N-methylpyrrolidone having a water content of 20 ppm were charged into the same reactor as that used in Synthesis Example 51. To this were added 210.6 g (20 mol % based on the total molar amount of all the monomer components) of anhydrous trimellitic acid chloride and 304.5 g (30 mol % on the same basis) of isophthalic acid dichloride. Then, 305.4 g (50 mol % on the same basis) of m-toluylenediamine was added. First, the polymerization was conducted from room temperature to 40° C. for 15 hours. Then, the temperature was elevated to 150° C. While maintaining this temperature, the polymerization was continued for 7 hours. After the polymerization was over, the polymer solution was double diluted with N-methylpyrrolidone, and the thus diluted polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. to obtain a polyamideimide powder. The resulting polyamideimide powder was heat treated at 250° C. for 24 hours. A reduced viscosity of the polyamideimide powder was measured in a dimethylformamide solution (concentration 1.0 g/dl) at 30° C., and found to be 0.26 dl/g.

SYNTHESIS EXAMPLE 53

Three (3) liters of N-methylpyrrolidone having a water content of 40 ppm were charged into the same reactor as that used in Synthesis Example 51. To this were added 333.1 g (30 mol % on the basis of the total molar amount of all the monomer components) of trimellitic anhydride, 192.0 g (20 mol % on the same basis) of isophthalic acid and then 503.3 g (50 mol % on the same basis) of 2,4-toluylene diisocyanate. Subsequently, the polymerization and the treatment were conducted in the same manner as in Synthesis Example 51 to obtain a polyamideimide powder. A reduced viscosity of the polyamideimide powder was measured in a dimethylformamide solution (concentration 1.0 g/dl) at 30° C., and found to be 0.35 dl/g.

SYNTHESIS EXAMPLE 54

Three (3) liters of N-methylpyrrolidone having a water content of 30 ppm were charged into the same reactor as that used in Synthesis Example 51. To this were added 444.2 g (40 mol % on the basis of the total molar amount of all the monomer components) of trimellitic anhydride, 96.0 g (10 mol % on the same basis) of isophthalic acid and then 503.3 g (50 mol % on the same basis) of 2,4-toluylene diisocyanate. Subsequently, the polymerization and the treatment were conducted in the same manner as in Synthesis Example 51 to obtain a polyamideimide powder. A reduced viscosity of the polyamideimide powder was measured in a dimethylformamide solution (concentration 1.0 g/dl) at 30° C., and found to be 0.30 d/g.

SYNTHESIS EXAMPLE 55

Three (3) liters of N-methylpyrrolidone having a water content of 30 ppm were charged into the same reactor as that used in Synthesis Example 51. To this were added 555.3 g (50 mol % on the basis of the total molar amount of all the monomer components) of trimellitic anhydride and then 503.3 g (50 mol % on the same basis) of 2,4-toluylene diisocyanate. When trimellitic anhydride was added, the water content in the reaction system was 25 ppm. First, the temperature of the contents was elevated from room temperature to 90° C. over a period of 20 minutes, and the polymerization was conducted at this temperature for 50 minutes. Thereafter, the temperature was elevated to 115° C. over a period of 15 minutes. While maintaining this temperature, the polymerization was continued for 4 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, separated by filtration and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.27 dl/g.

SYNTHESIS EXAMPLE 56

Three (3) liters of N-methylpyrrolidone having a water content of 15 ppm were charged into the same reactor as that used in Synthesis Example 51. To this were added 480.1 g (50 mol % on the basis of the total molar amount of all the monomer components) of isophthalic acid and then 503.3 g (50 mol % on the same basis) of 2,4-toluylene diisocyanate. When isophthalic acid was added, the water content in the reaction system was 50 ppm. First, the temperature of the contents was elevated from room temperature to 100° C. over a period of 20 minutes, and the polymerization was conducted at this temperature for 70 minutes. Thereafter, the temperature was elevated to 115° C. over a period of 15 minutes. While maintaining this temperature, the polymerization was continued for 4 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, then separated by filtration and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.30 dl/g.

The results in Synthesis Examples 51 to 56 are shown in Table 14.

EXAMPLE 51

Thirty (30) parts by weight of the aromatic copolyamideimide produced in Synthesis Example 51 and 70 parts by weight of a polyphenylene sulfide resin (hereinafter abbreviated as "PPS"; T-4, a trade name for a product made by Toprene Co., Ltd., a melt viscosity at 300° C. - 2,000 poises) were melt-kneaded at 340° C. and pelletized with a twin-screw extruder. The obtained pellets were injection-molded to form test pieces having a thickness of ¼ inch. The test pieces were measured for a heat deformation temperature at a stress of 18.6 kg/cm$^2$ to evaluate a heat resistance and a flexural strength to evaluate a mechanical strength.

Further, regarding a melt moldability, a melt flow value was measured at 350° C. under a stress of 60 kg/cm$^2$ by a capillary rheometer. The results are shown in Table 15.

EXAMPLES 52 TO 54

Example 51 was repeated except that the mixing ratio was changed. The results are shown in Table 15.

EXAMPLES 55 TO 57

Example 52 was repeated except that the aromatic copolyamideimide in Example 52 was replaced with the aromatic copolyamideimides in Synthesis Example 52 to 54. The results are shown in Table 15.

COMPARATIVE EXAMPLES 51 TO 56

Examples 51 to 53 were repeated except that the aromatic copolyamideimides in Examples 51 to 53 were replaced with the aromatic copolyamideimides in Synthesis Examples 55 and 56. The results are shown in Table 16.

EXAMPLE 58

Twenty-five (25) parts by weight of the aromatic copolyamideimide produced in Synthesis Example 51, 35 parts by weight of PPS and 40 parts by weight of glass fibers (hereinafter referred to as "glass fibers" or "GF"; 03JAFT540, a trade name for chopped strands made by Asahi Fiber Glass Co., Ltd.) were melt kneaded at 350° C. and pelletized with a twin-screw extruder. The obtained pellets were injection-molded to form test pieces having a thickness of ¼ inch. The test pieces were measured for a heat deformation temperature at a stress of 18.6 kg/cm$^2$ and a flexural modulus at 200° C.

Further, regarding a melt moldability, a melt flow value was measured at 350° C. under a stress of 60 kg/cm$^2$ by a capillary rheometer. The results are shown in Table 17.

EXAMPLES 59 AND 60

Example 58 was repeated except that the aromatic copolyamideimide in Example 58 was replaced with the aromatic copolyamideimides in Synthesis Examples 53 and 54. The results are shown in Table 17.

COMPARATIVE EXAMPLES 57 AND 58

Example 58 was repeated except that the aromatic copolyamideimide in Example 58 was replaced with the aromatic copolyamideimides in Synthesis Examples 55 and 56. The results are shown in Table 17.

TABLE 14

| Synthesis Example | Composition of acid components TMA/IPA (mole %) (mole %) | Diisocyanate TDI (mole %) | Glass transition point (°C.) |
|---|---|---|---|
| 51 | 20/30 | 50 | 290 |
| 52 | (20/30) (acid chloride) | (50) (m-TDA) | 290 |
| 53 | 30/20 | 50 | 305 |
| 54 | 40/10 | 50 | 310 |
| 55 | 50/0 | 50 | 326 |
| 56 | 0/50 | 50 | 260 |

TMA; trimellitic anhydride
IPA; isophthalic acid
TDI; 2,4-toluylene diisocyanate
m-TDA; m-toluylenediamine
acid chloride; anhydrous trimellitic acid chloride/isophthalic acid dichloride

TABLE 15

| | Kind of amide-imide | PPS (wt. %) | Heat deformation temp. (°C.) | Flexural strength (MPa) | Melt-flow value × 10$^{-1}$ (cc/sec) |
|---|---|---|---|---|---|
| Ex. 51 | Synthesis Example 51 30 | 70 | 168 | 130 | >10 |
| Ex. 52 | Synthesis Example 51 50 | 50 | 230 | 160 | 6.2 |
| Ex. 53 | Synthesis Example 51 70 | 30 | 252 | 150 | 1.0 |
| Ex. 54 | Synthesis Example 51 75 | 25 | 253 | 135 | 0.05 |
| Ex. 55 | Synthesis Example 52 50 | 50 | 230 | 155 | 6.8 |
| Ex. 56 | Synthesis Example 53 50 | 50 | 230 | 157 | 4.7 |
| Ex. 57 | Synthesis Example 54 50 | 50 | 230 | 150 | 3.8 |

TABLE 16

| | Kind of amide-imide | PPS (wt. %) | Heat deformation temp. (°C.) | Flexural strength (MPa) | Melt-flow value × 10$^{-1}$ (cc/sec) |
|---|---|---|---|---|---|
| Comp. Ex. 51 | Synthesis Example 55 30 | 70 | 170 | 120 | 7.0 |
| Comp. Ex. 52 | Synthesis Example 55 50 | 50 | 230 | 140 | 3.0 |
| Comp. Ex. 53 | Synthesis Example 55 70 | 30 | 248 | 130 | 0.6 |
| Comp. Ex. 54 | Synthesis Example 56 30 | 70 | 140 | 120 | 7.4 |
| Comp. Ex. 55 | Synthesis Example 56 50 | 50 | 207 | 100 | 3.8 |
| Comp. Ex. 56 | Synthesis Example 56 70 | 30 | 220 | 80 | 0.8 |

TABLE 17

| | Kind of amide-imide (wt. %) | PPS (wt. %) | GF (wt. %) | Heat deformation temp. (°C.) | Flexural modulus (GPa) | Melt-flow value x $10^{-1}$ (cc/sec) |
|---|---|---|---|---|---|---|
| Ex. 58 | Synthesis Example 51 25 | 35 | 40 | 274 | 5.6 | 2.3 |
| Ex. 59 | Synthesis Example 53 25 | 35 | 40 | 275 | 5.5 | 1.8 |
| Ex. 60 | Synthesis Example 54 25 | 35 | 40 | 275 | 5.2 | 1.3 |
| Comp. Ex. 57 | Synthesis Example 55 25 | 35 | 40 | 275 | 5.0 | 0.8 |
| Comp. Ex. 58 | Synthesis Example 56 25 | 35 | 40 | 260 | 3.2 | 2.1 |

Note) Flexural modulus was measured at 200° C.

SYNTHESIS EXAMPLE 61

Three (3) liters of N-methylpyrrolidone having a water content of 40 ppm were charged into a 5-liter reactor equipped with a stirrer, a thermometer and a reflux condenser having a drying tube whose top was filled with calcium chloride. To this were added 222.1 g (20 mol % based on the total molar amount of all the monomer components) of trimellitic anhydride, 288.1 g (30 mol % on the same basis) of isophthalic acid and then 503.3 g (50 mol % on the same basis) of 2,4-toluylene diisocyanate. When trimellitic anhydride and isophthalic acid were added, the water content in the reaction system was 30 ppm. First, the temperature of the contents was elevated from room temperature to 100° C. over a period of 20 minutes, and the polymerization was conducted at this temperature for 4 hours. Then, the temperature was elevated to 160° C. over a period of 15 minutes. While maintaining this temperature, the polymerization was continued for 4 hours. After the polymerization was over, the polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.40 dl/g. A glass transition temperature of the polyamideimide powder was measured by differential scanning calorimetry (DSC) method. The results are shown in Table 18 together with the results in other Synthesis Examples.

SYNTHESIS EXAMPLE 62

Three (3) liters of N-methylpyrrolidone having a water content of 20 ppm were charged into the same reactor as that used in Synthesis Example 61. To this were added 210.6 g (20 mol % based on the total molar amount of all the monomer components) of anhydrous trimellitic acid chloride and 304.5 g (30 mol % on the same basis) of isophthalic acid dichloride. Then, 305.4 g (50 mol % on the same basis) of m-toluylenediamine was added. First, the polymerization was conducted from room temperature to 40° C. over a period of 15 minutes. The temperature was then elevated to 150° C. While maintaining this temperature, the polymerization was continued for 7 hours. After the polymerization was over, the polymer solution was double diluted with N-methylpyrrolidone, and the thus diluted polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. to obtain a polyamideimide powder. The resulting polyamideimide powder was heat treated at 250° C. for 24 hours. A reduced viscosity of the polyamideimide powder was measured in a dimethylformamide solution (concentration 1.0 g/dl) at 30° C., and found to be 0.26 dl/g.

SYNTHESIS EXAMPLE 63

Three (3) liters of N-methylpyrrolidone having a water content of 40 ppm were charged in the same reactor as that used in Synthesis Example 1. To this were added 333.1 g (30 mol % based on the total molar amount of all the monomer components) of trimellitic anhydride, 192.0 g (20 mol % on the same basis) of isophthalic acid and then 503.3 g (50 mol %) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and found to be 0.35 dl/g.

SYNTHESIS EXAMPLE 64

Three (3) liters of N-methylpyrrolidone having a water content of 30 ppm were charged in the same reactor as that used in Synthesis Example 61. To this were added 444.2 g (40 mol % based on the total molar amount of all the monomer components) of trimellitic anhydride, 96.0 g (10 mol % on the same basis) of isophthalic acid and then 503.3 g (50 mol %) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and found to be 0.30 dl/g.

SYNTHESIS EXAMPLE 65

Three (3) liters of N-methylpyrrolidone having a water content of 30 ppm were charged into the same reactor as that used in Synthesis Example 61. To this were added 555.3 g (50 mol % based on the total molar amount of all the monomer components) of trimellitic anhydride and then 503.3 g (50 mol % on the same basis) of 2,4-toluylene diisocyanate. When trimellitic anhydride was added, the water content in the reaction system was 25 ppm. First, the temperature of the contents was elevated from room temperature to 90° C. over a period of 20 minutes, and the polymerization was conducted at this temperature for 50 minutes. Then, the temperature was elevated to 115° C. over a period of 15 minutes. While maintaining this temperature, the polymerization was continued for 4 hours. After the polymerization was over, the polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.27 dl/g.

SYNTHESIS EXAMPLE 66

Three (3) liters of N-methylpyrrolidone having a water content of 15 ppm were charged into the same reactor as that used in Synthesis Example 61. To this were added 480.1 g (50 mol % based on the total molar amount of all the monomer components) of isophthalic acid and then 503.3 g (50 mol % on the same basis) of 2,4-toluylene diisocyanate. When isophthalic acid was added, the water content in the reaction system was 50 ppm. First, the temperature of the contents was elevated from room temperature to 100° C. over a period of 20 minutes, and the polymerization was conducted at this temperature for 70 minutes. Subsequently, the temperature was elevated to 115° C. over a period of 15 minutes. While maintaining this temperature, the polymerization was continued for 4 hours. After the polymerization was over, the polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.30 dl/g.

SYNTHESIS EXAMPLE 67

Three (3) liters of N-methylpyrrolidone having a water content of 15 ppm were charged into the same reactor as that used in Synthesis Example 61. To this were added 422.3 g (50 mol % based on the total molar amount of all the monomer components) of adipic acid and then 503.3 g (50 mol % on the same basis) of 2,4-toluylene diisocyanate. When adipic acid was added, the water content in the reaction system was 50 ppm. First, the temperature of the contents was elevated from room temperature to 100° C. over a period of 20 minutes, and the polymerization was conducted at this temperature for 70 minutes. Subsequently, the temperature was elevated to 145° C. over a period of 15 minutes. While maintaining this temperature, the polymerization was continued for 4 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, then separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.35 dl/g.

The results in Synthesis Examples 61 to 67 are shown in Table 18.

EXAMPLE 62

Thirty (30) parts by weight of the aromatic copolyamideimide produced in Synthesis Example 61 and 70 parts by weight of PPS were melt-kneaded at 340° C. and pelletized with a twin-screw extruder. The obtained pellets were injection-molded to form test pieces having a thickness of ¼ inch. The test pieces were measured for a heat deformation temperature at a stress of 18.6 kg/cm$^2$ to evaluate a heat resistance and for a flexural strength to evaluate a mechanical strength.

Further, regarding a melt moldability, a melt flow value was measured at 350° C. under a stress of 60 kg/cm$^2$ by a capillary rheometer. The results are shown in Table 19.

EXAMPLES 62 TO 64

Example 61 was repeated except that the mixing ratio was changed. The results are shown in Table 2.

EXAMPLES 65 TO 67

Example 62 was repeated except that the aromatic copolyamideimide in Example 62 was replaced with the aromatic copolyamideimides in Synthesis Examples 62 to 64. The results are shown in Table 20.

COMPARATIVE EXAMPLES 61 TO 69

Examples 61 to 63 were repeated except that the copolyamideimides in Examples 61 to 63 were replaced with the aromatic copolyamideimides in Synthesis Examples 65 to 67. The results are shown in Table 20.

EXAMPLE 68

Twenty-five (25) parts by weight of the aromatic copolyamideimide produced in Synthesis Example 61, 35 parts by weight of PPS and 40 parts by weight of glass fibers were melt-kneaded at 350° C. and pelletized with a twin-screw extruder. The obtained pellets were injection-molded to form test pieces having a thickness of ¼ inch. The test pieces were measured for a heat deformation temperature at a stress of 18.6 kg/cm² to evaluate a heat resistance and for a flexural modulus at 200° C.

Further, regarding a melt moldability, a melt flow value was measured at 350° C. under a stress of 60 kg/cm² by a capillary rheometer. The results are shown in Table 21.

EXAMPLES 69 AND 70

Example 68 was repeated except that the aromatic copolyamideimide in Example 68 was replaced with the aromatic copolyamideimides in Synthesis Examples 63 and 64. The results are shown in Table 21.

COMPARATIVE EXAMPLE 70

Example 68 was repeated except that the aromatic copolyamideimide in Example 68 was replaced with the aromatic copolyamideimide in Synthesis Example 65. The results are shown In Table 21.

COMPARATIVE EXAMPLE 71

Example 68 was repeated except that the aromatic copolyamideimide in Example 68 was replaced with the aromatic copolyamideimide in Synthesis Example 66. The results are shown in Table 21.

COMPARATIVE EXAMPLE 12

Example 68 was repeated except that the aromatic copolyamideimide in Example 68 was replaced with the aromatic copolyamideimide in Synthesis Example 67. The results are shown in Table 21.

TABLE 18

| Synthesis Example | Composition of acid components TMA/IPA/ADA (mole %) (mole %) (mole %) | Diisocyanate TDI (mole %) | Glass transition point (°C.) |
|---|---|---|---|
| 61 | 20/25/5 | 50 | 280 |
| 62 | (20/25/5) (acid chloride) | (50) (m-TDA) | 280 |
| 63 | 30/15/5 | 50 | 295 |
| 64 | 40/5/5 | 50 | 305 |
| 65 | 50/0/0 | 50 | 326 |
| 66 | 0/50/10 | 50 | 260 |
| 67 | 0/50/0 | 50 | 155 |

TMA; trimellitic anhydride
IPA; isophthalic acid
ADA; adipic acid
TDI; 2,4-toluylene diisocyanate
m-TDA; m-toluylene diamine
acid chloride; anhydrous trimellitic acid chloride/isophthalic acid dichloride/adipic dichloride

TABLE 19

| | Kind of amide-imide (wt. %) | PPS (wt. %) | Heat deformation temp. (°C.) | Flexural strength (MPa) | Melt-flow value × $10^{-1}$ (cc/sec) |
|---|---|---|---|---|---|
| Ex. 61 | Synthesis Example 61 30 | 70 | 166 | 130 | >10 |
| Ex. 62 | Synthesis Example 61 50 | 50 | 230 | 170 | 7.2 |
| Ex. 63 | Synthesis Example 61 70 | 30 | 250 | 150 | 1.3 |
| Ex. 64 | Synthesis Example 61 75 | 25 | 253 | — | 0.7 |
| Ex. 65 | Synthesis Example 62 50 | 50 | 225 | 160 | 7.8 |
| Ex. 66 | Synthesis Example 63 50 | 50 | 230 | 150 | 6.8 |
| Ex. 67 | Synthesis Example 64 50 | 50 | 230 | 150 | 5.4 |

TABLE 20

| | Kind of amide-imide (wt. %) | PPS (wt. %) | Heat deformation temp. (°C.) | Flexural strength (MPa) | Melt-flow value × $10^{-1}$ (cc/sec) |
|---|---|---|---|---|---|
| Comp. Ex. 61 | Synthesis Example 65 30 | 70 | 170 | 120 | 7.0 |
| Comp. Ex. 62 | Synthesis Example 65 50 | 50 | 230 | 140 | 3.0 |
| Comp. Ex. 63 | Synthesis Example 65 70 | 30 | 248 | 130 | 0.6 |
| Comp. Ex. 64 | Synthesis Example 66 30 | 70 | 140 | 120 | 7.4 |
| Comp. Ex. 65 | Synthesis Example 66 50 | 50 | 207 | 100 | 3.8 |
| Comp. Ex. 66 | Synthesis Example 66 70 | 30 | 220 | 80 | 0.8 |
| Comp. Ex. 67 | Synthesis Example 67 30 | 70 | 107 | 110 | >10 |
| Comp. Ex. 68 | Synthesis Example 67 50 | 50 | 125 | 90 | 6.2 |
| Comp. Ex. 69 | Synthesis Example 67 70 | 30 | 143 | 80 | 1.1 |

TABLE 21

|   | Kind of amide-imide (wt. %) | PPS (wt. %) | GF (wt. %) | Heat deformation temp. (°C.) | Flexural modulus (GPa) | Melt-flow value × $10^{-1}$ (cc/sec) |
| --- | --- | --- | --- | --- | --- | --- |
| Ex. 68 | Synthesis Example 61 30 | 30 | 40 | 273 | 5.7 | 3.0 |
| Ex. 69 | Synthesis Example 63 30 | 30 | 40 | 275 | 5.6 | 2.1 |
| Ex. 70 | Synthesis Example 64 30 | 30 | 40 | 275 | 5.3 | 1.5 |
| Comp. Ex. 70 | Synthesis Example 65 30 | 30 | 40 | 275 | 5.0 | 0.8 |
| Comp. Ex. 71 | Synthesis Example 66 30 | 30 | 40 | 260 | 3.2 | 2.1 |
| Comp. Ex. 72 | Synthesis Example 67 30 | 30 | 40 | 260 | 2.5 | 2.7 |

Note) Flexural modulus was measured at 200° C.

Examples of a resin composition using a liquid crystal polymer (D)

SYNTHESIS EXAMPLE 81

Three (3) liters of N-methylpyrrolidone having a water content of 40 ppm were charged into a 5-liter reactor equipped with a stirrer, a thermometer and a reflux condenser having a drying tube whose top was filled with calcium chloride. To this were added 222.1 g (20 mol %) of trimellitic anhydride, 192.1 g (20 mol %) of isophthalic acid, 84.4 g (10 mol %) of adipic acid and then 503.3 g (50 mol %) of 2,4-toluylene diisocyanate. When trimellitic anhydride, isophthalic acid and adipic acid were added, the water content in the reaction system was 50 ppm. First, the temperature of the contents was elevated from room temperature to 100° C. over a period of 20 minutes, and the polymerization was conducted at this temperature for 4 hours. Then, the temperature was elevated to 160° C. over a period of 15 minutes. While maintaining this temperature, the polymerization was continued for 4 hours. After the polymerization was over, the polymer solution was added dropwise to methanol in a volume which was twice that of N-methylpyrrolidone with vigorous stirring. The precipitated polymer was separated by suction filtration, further redispersed in methanol for full washing, then separated by filtration, and dried under reduced pressure at 200° C. for 10 hours to obtain a polyamideimide powder. A reduced viscosity of the polyamideimide powder was measured in a dimethylformamide solution (concentration 1.0 g/dl) at 30° C., and found to be 0.40 dl/g. A glass transition temperature of the polyamideimide powder was measured by differential scanning calorimetry (DSC) method. The results are shown in Table 22 together with the results in other Synthesis Examples.

SYNTHESIS EXAMPLE 82

Three (3) liters of N-methylpyrrolidone having a water content of 20 ppm were charged into a 5-liter reactor equipped with a stirrer, a thermometer and a reflux condenser having a drying tube whose top was filled with calcium chloride. Anhydrous trimellitic acid chloride (210.6 g: 20 mol %), 203.0 g (20 mol %) of isophthalic acid dichloride and 91.6 g (10 mol %) of adipic acid dichloride were added to a 5-liter reactor equipped with a stirrer, a thermometer and a reflux condenser having a drying tube whose top was filled with calcium chloride. Then, 305.4 g (50 mol %) of m-toluylenediamine was added. First, the polymerization was conducted from room temperature to 40° C. over a period of 15 hours. Subsequently, the temperature was elevated to 150° C. While maintaining this temperature, the polymerization was continued for 7 hours. After the polymerization was over, the polymer solution was double diluted with N-methylpyrrolidone, and the diluted polymer solution was added dropwise to methanol in a volume which was twice that of N-methylpyrrolidone under vigorous stirring. The precipitated polymer was separated by suction filtration, further redispersed in methanol for full washing, then separated by filtration, and dried under reduced pressure at 200° C. to obtain a polyamideimide powder. The obtained polyamideimide powder was heat treated at 240° C. for 24 hours. A reduced viscosity of the resulting polyamideimide powder was measured in a dimethylformamide solution (concentration 1.0 g/dl) at 30° C., and found to be 0.30 dl/g.

SYNTHESIS EXAMPLE 83

Three (3) liters of N-methylpyrrolidone having a water content of 40 ppm were charged into the same reactor as that used in Synthesis Example 81. To this were added 222.1 g (20 mol %) of trimellitic anhydride, 288.1 g (30 mol %) of isophthalic acid and then 503.3 g (50 mol %) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and found to be 0.40 dl/g.

SYNTHESIS EXAMPLE 84

Three (3) liters of N-methylpyrrolidone having a water content of 40 ppm were charged into the same reactor as that used in Synthesis Example 81. To this were added 333.1 g (30 mol %) of trimellitic anhydride, 144.0 g (15 mol %) of isophthalic acid, 42.2 g (5 mol %) of adipic acid and then 503.3 g (50 mol %) of 2,4-toluylene diisocyanate. Subsequently, the polymerization and the treatment were conducted as in Synthesis Example 1 to obtain a polyamideimide powder. A reduced viscosity of the polyamideimide powder was measured in a dimethylformamide solution (concentration 1.0 g/dl) at 30° C., and found to be 0.35 dl/g.

SYNTHESIS EXAMPLE 85

Three (3) liters of N-methylpyrrolidone having a water content of 30 ppm were charged into the same reactor as that used in Synthesis Example 81. To this were added 333.1 g (30 mol %) of trimellitic anhydride, 192.0 g (20 mol %) of isophthalic acid and then 503.3 g (50 mol %) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and found to be 0.33 dl/g.

SYNTHESIS EXAMPLE 86

Three (3) liters of N-methylpyrrolidone having a water content of 40 ppm were charged into the same reactor as that used in Synthesis Example 81. To this were added 166.6 g (15 mol %) of trimellitic anhydride, 48.0 g (5 mol %) of isophthalic acid, 253.2 g (30 mol %) of adipic acid and then 503.3 g (50 mol %) of 2,4-toluylene diisocyanate. Subsequently, the polymerization and the treatment were conducted in the same manner as in Synthesis Example 1 to obtain a polyamideimide powder. A reduced viscosity of the polyamideimide powder was measured in a dimethylformamide solution (concentration 1.0 g/dl) at 30° C., and found to be 0.35 dl/g.

SYNTHESIS EXAMPLE 87

Three (3) liters of N-methylpyrrolidone having a water content of 30 ppm were charged into the same reactor as that used in Synthesis Example 81. To this were added 555.3 g (50 mol %) of trimellitic anhydride and then 503.3 g (50 mol %) of 2,4-toluylene diisocyanate. When trimellitic anhydride was added, the water content in the reaction system was 25 ppm. First, the temperature of the contents was elevated from room temperature to 90° C. over a period of 20 minutes, and the polymerization was conducted at this temperature for 50 minutes. Then, the temperature was elevated to 115° C. over a period of 15 minutes. While maintaining this temperature, the polymerization was continued for 4 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, then separated by filtration and dried at 200° C. for 15 hours under reduced pressure to obtain a polyamideimide powder. A reduced viscosity of the polyamideimide powder was measured in a dimethylformamide solution (concentration 1.0 g/dl) at 30° C., and found to be 0.27 dl/g.

SYNTHESIS EXAMPLE 88

Three (3) liters of N-methylpyrrolidone having a water content of 15 ppm were charged into the same reactor as that used in Synthesis Example 81. To this were added 480.1 g (50 mol %) of isophthalic acid and then 503.3 g (50 mol %) of 2,4-toluylene diisocyanate. When isophthalic acid was added, the water content in the reaction system was 50 ppm. First, the temperature of the contents was elevated from room temperature to 100° C. over a period of 20 minutes, and the polymerization was conducted at this temperature for 70 minutes. Then, the temperature was elevated to 115° C. over a period of 15 minutes. While maintaining this temperature, the polymerization was continued for 4 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, separated by filtration and dried at 200° C. under reduced pressure to obtain a polyamideimide powder. A reduced viscosity of the polyamideimide powder was measured in a dimethylformamide solution (concentration 1.0 g/dl) at 30° C., and found to be 0.30 dl/g.

SYNTHESIS EXAMPLE 89

Three (3) liters of N-methylpyrrolidone having a water content of 15 ppm were charged into the same reactor as that used In Synthesis Example 81. To this were added 422.3 g (50 mol %) of adipic acid and then 503.3 g (50 mol %) of 2,4-toluylene diisocyanate. When adipic acid was added, the water content in the reaction system was 50 ppm. First, the temperature of the contents was elevated from room temperature to 100° C. over a period of 20 minutes, and the polymerization was conducted at this temperature for 70 minutes. Then, the temperature was elevated to 145° C. over a period of 15 minutes. While maintaining this temperature, the polymerization was continued for 4 hours. After the polymerization was over, the polymer solution was added dropwise to methanol in a volume which was twice that of N-methylpyrrolidone under vigorous stirring. The precipitated polymer was separated by suction filtration, further redispersed in methanol for full washing, separated by filtration and dried at 200° C. under reduced pressure to obtain a polyamideimide powder. A reduced viscosity of the polyamideimide powder was measured in a dimethylformamide solution (concentration 1.0 g/dl) at 30° C., and found to be 0.35 dl/g.

SYNTHESIS EXAMPLE 90 p-Acetoxybenzoic acid (1,081 g: 60 mol %), 388 g (20 mol %) of 1,4-diacetoxybenzene, 110 g (2 mol %) of 4,4'-diphenylether-bis(N-trimellitoimide) and 389 g (18 mol %) of 2,6-naphthalenedicarboxylic acid were charged into a 5-liter reactor equipped with a stirrer, a thermometer, a pressure gauge, a nitrogen gas introducing tube and a distillation head. After the reactor was purged thrice with a nitrogen gas, the temperature was elevated to 200° C. while a small amount of a nitrogen gas passed through the reactor with gentle stirring.

After the temperature reached 200° C., a rate of stirring was increased, and the mixture was reacted at 240° C. for 1 hour, at 260° C. for 1 hour, at 280° C. for 1 hour and at 300° C. for 2 hours.

Subsequently, the pressure inside the reactor was gradually reduced. While maintaining the pressure at a vacuum of 0.5 torr, the reaction mixture was stirred at 300° C. for 1 hour, at 320° C. for 30 minutes and at 340° C. for 30 minutes to complete the polymerization.

A logarithmic viscosity of the resulting polymer was measured in pentafluorophenol in a concentration of 0.16 g/dl at 60° C., and found to be 3.99 dl/g.

SYNTHESIS EXAMPLE 91 p-Acetoxybenzoic acid (1,080 g: 60 mol %), 388 g (20 mol %) of 1,4-diacetoxybenzene, 358 g (10 mol %) of 1,6-bis(phenoxy)hexane-4,4'-dicarboxylic acid and 216 g (10 mol %) of 2,6-naphthalenedicarboxylic acid were charged into the same 5-liter reactor as that used in Synthesis Example 9. In the same manner as in Synthesis Example 9, the mixture was reacted at 240° C. for 3.5 hours, at 260° C. for 2 hours and at 280° C. for 1.5 hours.

Subsequently, the pressure inside the reactor was gradually reduced. While maintaining the pressure at a vacuum of 0.5 torr, the reaction mixture was stirred at 280° C. for 8.5 hours and at 300° C. for 3 hours to complete the polymerization.

A logarithmic viscosity of the resulting polymer was measured in pentafluorophenol in a concentration of 0.16 g/dl at 60° C., and found to be 2.56 dl/g.

SYNTHESIS EXAMPLE 92 p-Acetoxybenzoic acid (1,081 g: 50 mol %) and 1,380 g (50 mol %) of 6-acetoxy-2-naphthoic acid were charged into the same 5-liter reactor as that used in Synthesis Example 9, and the mixture was reacted in the same manner as in Synthesis Example 89 to complete the polymerization.

SYNTHESIS EXAMPLE 93 p-Acetoxybenzoic acid (1,081 g: 60 mol %), 388 g (20 mol %) of 1,4-diacetoxybenzene and 432 g (20 mol %) of 2,6-naphthalenedicarboxylic acid were charged into the same 5-liter reactor as that used in Synthesis Example 89, and the mixture was reacted in the same manner as in Synthesis Example 89 to complete the polymerization.

A logarithmic viscosity of the polymer was measured in pentafluorophenol in a concentration of 0.16 g/dl at 60° C., and found to be 5.42 dl/g.

SYNTHESIS EXAMPLE 94 p-Acetoxybenzoic acid (1,081 g: 60 mol %) and 768 g (40 mol %) of polyethylene terephthalate were charged into the same 5-liter reactor as that used in Synthesis Example 89, and the mixture was reacted in the same manner as in Synthesis Example 89 to complete the polymerization.

The results in Synthesis Example 81 to 94 are shown in Table 22.

EXAMPLE 81

Twenty-five (25) percent by weight of the aromatic copolyamideimide produced in Synthesis Example 81 and 75% by weight of the liquid crystal polyester produced in Synthesis Example 90 were melt-kneaded at 320° C. and pelletized with a twin-screw extruder. The obtained pellets were injection-molded to form test pieces having a thickness of ⅛. The test pieces were measured for a heat deformation temperature at a stress of 18.6 kg/cm$^2$ to evaluate a heat resistance and for a flexural modulus and a strength to evaluate mechanical characteristics.

Further, regarding a melt moldability, a melt flow value was measured at 310° C. under a stress of 20 kg/cm$^2$ by a capillary rheometer. The results are shown in Table 23.

EXAMPLES 82 TO 85

Example 81 was repeated with the formulation shown in Table 23. The results are shown in Table 23.

COMPARATIVE EXAMPLE 81

The aromatic copolyamideimide in Synthesis Example 81 was compression-molded at 350° C., and the molded piece was measured for a flexural modulus. The results are shown in Table 22.

COMPARATIVE EXAMPLE 82

The liquid crystal polyester in Synthesis Example 90 was injection-molded, and the molded piece was measured for a flexural modulus, a strength, a heat deformation temperature and a melt flow value in the same manner as in Example 81. The results are shown in Table 24.

COMPARATIVE EXAMPLES 83 TO 87

Examples 81 to 85 were repeated except that the aromatic copolyamideimides in Examples 81 to 85 were replaced with the aromatic copolyamideimide in Synthesis Example 87. The results are shown in Table 23.

EXAMPLE 86

Example 82 was repeated except that the aromatic copolyamideimide in Example 82 was replaced with the aromatic copolyamideimide in Synthesis Example 82. The results are shown in Table 24.

EXAMPLE 87

Example 82 was repeated except that the aromatic copolyamideimide in Example 82 was replaced with the aromatic copolyamideimide in Synthesis Example 83. The results are shown in Table 24.

EXAMPLE 88

Example 82 was repeated except that the aromatic copolyamideimide in Example 82 was replaced with the aromatic copolyamideimide in Synthesis Example 84. The results are shown in Table 24.

EXAMPLE 89

Example 82 was repeated except that the aromatic copolyamideimide in Example 82 was replaced with the aromatic copolyamideimide in Synthesis Example 85. The results are shown in Table 24.

COMPARATIVE EXAMPLES 88 TO 90

Example 92 was repeated except that the aromatic copolyamideimide in Example 92 was replaced with the aromatic copolyamideimides in Synthesis Examples 86, 88 and 89. The results are shown in Table 24.

EXAMPLE 90

Example 92 was repeated except that the liquid crystal polyester in Example 92 was replaced with the liquid crystal polyester In Synthesis Example 91. The results are shown in Table 25.

EXAMPLE 91

Example 92 was repeated except that the liquid crystal polyester in Example 92 was replaced with the liquid crystal polyester in Synthesis Example 92. The results are shown in Table 25.

EXAMPLE 92

Example 82 was repeated except that the liquid crystal polyester was replaced with the liquid crystal polyester in Synthesis Example 93. The results are shown in Table 25.

EXAMPLE 93

Example 82 was repeated except that the liquid crystal polyester in Example 82 was replaced with the liquid crystal polyester in Synthesis Example 94. The results are shown in Table 25.

COMPARATIVE EXAMPLE 91

Example 90 was repeated except that the aromatic copolyamideimide in Example 90 was replaced with the aromatic polyamide in Synthesis Example 87. The results are shown in Table 25.

COMPARATIVE EXAMPLE 92

Example 91 was repeated except that the aromatic copolyamideimide in Example 91 was replaced with the aromatic polyamideimide in Synthesis Example 87. The results are shown in Table 25.

COMPARATIVE EXAMPLE 93

Example 92 was repeated except that the aromatic copolyamideimide in Example 92 was replaced with the aromatic polyamide in Synthesis Example 87. The results are shown in Table 25.

COMPARATIVE EXAMPLE 94

Example 93 was repeated except that the aromatic copolyamideimide in Example 93 was replaced with the aromatic polyamide in Synthesis Example 87. The results are shown in Table 25.

EXAMPLE 94

Forty (40) percent by weight of the aromatic copolyamideimide produced in Synthesis Example 81 and 60% by weight of the liquid crystal polyester produced in Synthesis Example 90 were melt-kneaded at 320° C. and pelletized with a twin-screw extruder. The obtained pellets were injection-molded to form square test pieces which were 10 cm long, 10 cm broad and 3 mm thick. The test pieces were cut in a resin flow direction and a direction normal to the resin flow direction. These cut test pieces were measured for a flexural modulus in both directions to evaluate an anisotropy. The results are shown in Table 26.

COMPARATIVE EXAMPLE 95

Example 94 was repeated except that the aromatic copolyamideimide in Example 94 was replaced with the aromatic polyamide in Synthesis Example 87. The results are shown in Table 26.

TABLE 22

| Synthesis Example | Composition of acid components TMA/IPA/ADA (mole %) (mole %) (mole %) | Diisocyanate TDI (mole %) | Glass transition point (°C.) |
|---|---|---|---|
| 81 | 20/25/10 | 50 | 280 |
| 82 | (20/25/5) (acid chloride) | (50) (m-TDA) | 250 |
| 83 | 20/30/0 | 50 | 290 |
| 84 | 30/15/5 | 50 | 295 |
| 85 | 30/20/0 | 50 | 305 |
| 86 | 15/5/30 | 50 | 173 |
| 87 | 50/0/0 | 50 | 326 |
| 88 | 0/50/0 | 50 | 260 |
| 89 | 0/0/50 | 50 | 155 |

TMA; trimellitic anhydride
IPA; isophthalic acid
ADA; adipic acid
TDI; 2,4-toluylene diisocyanate
m-TDA; m-toluylene diamine
acid chloride; anhydrous trimellitic acid chloride/isophthalic acid dichloride/adipic dichloride

TABLE 23

| | PAI (wt. %) | LCP (wt. %) | Modulus (GPa) | Strength (MPa) | HDT (°C.) | Q value (cc/sec) |
|---|---|---|---|---|---|---|
| Ex. 81 | 25 (Synthesis Example 81) | 75 (Synthesis Example 90) | 5.2 | 110 | 208 | 0.03 |
| Ex. 82 | 40 (Synthesis Example 81) | 60 (Synthesis Example 90) | 5.2 | 110 | 215 | 0.03 |
| Ex. 83 | 50 (Synthesis Example 81) | 50 (Synthesis Example 90) | 4.9 | 100 | 218 | 0.02 |
| Ex. 84 | 60 (Synthesis Example 81) | 40 (Synthesis Example 90) | 4.8 | 100 | 222 | 0.002 |
| Ex. 85 | 75 (Synthesis Example 81) | 25 (Synthesis Example 90) | 4.5 | 90 | 232 | 0.001 |
| Comp. Ex. 81 | 100 (Synthesis Example 81) | | 3.6 | | | |
| Comp. Ex. 82 | — | 100 (Synthesis | 4.2 | 110 | 167 | 0.18 |

TABLE 23-continued

| | PAI (wt. %) | LCP (wt. %) | Modulus (GPa) | Strength (MPa) | HDT (°C.) | Q value (cc/sec) |
|---|---|---|---|---|---|---|
| Comp. Ex. 83 | 25 (Synthesis Example 87) | 75 (Synthesis Example 90) | 4.2 | 80 | 180 | 0.03 |
| Comp. Ex. 84 | 40 (Synthesis Example 87) | 60 (Synthesis Example 90) | 4.2 | 80 | 184 | 0.02 |
| Comp. Ex. 85 | 50 (Synthesis Example 87) | 50 (Synthesis Example 90) | 4.0 | 80 | 200 | 0.02 |
| Comp. Ex. 86 | 60 (Synthesis Example 87) | 40 (Synthesis Example 90) | 3.7 | 70 | 202 | 0.003 |
| Comp. Ex. 87 | 75 (Synthesis Example 87) | 25 (Synthesis Example 90) | 4.5 | 60 | 204 | 0.001 |

TABLE 24

| | PAI (wt. %) | LCP (wt. %) | Modulus (GPa) | Strength (MPa) | HDT (°C.) | Q value (cc/sec) |
|---|---|---|---|---|---|---|
| Ex. 86 | 40 (Synthesis Example 82) | 60 (Synthesis Example 90) | 5.2 | 100 | 207 | 0.05 |
| Ex. 87 | 40 (Synthesis Example 83) | 60 (Synthesis Example 90) | 5.1 | 100 | 210 | 0.02 |
| Ex. 88 | 40 (Synthesis Example 84) | 60 (Synthesis Example 90) | 4.9 | 90 | 212 | 0.02 |
| Ex. 89 | 40 (Synthesis Example 85) | 60 (Synthesis Example 90) | 5.0 | 90 | 213 | 0.02 |
| Comp. Ex. 88 | 40 (Synthesis Example 86) | 60 (Synthesis Example 90) | 3.2 | 50 | 167 | 0.02 |
| Comp. Ex. 89 | 40 (Synthesis Example 88) | 60 (Synthesis Example 90) | 3.7 | 60 | 180 | 0.02 |
| Comp. Ex. 90 | 40 (Synthesis Example 89) | 60 (Synthesis Example 90) | 3.0 | 40 | 163 | 0.03 |

TABLE 25

| | PAI (wt. %) | LCP (wt. %) | Modulus (GPa) | Strength (MPa) | HDT (°C.) | Q value (cc/sec) |
|---|---|---|---|---|---|---|
| Ex. 90 | 40 (Synthesis Example 81) | 60 (Synthesis Example 91) | 4.7 | 70 | 255 | 0.04 |
| Ex. 91 | 40 (Synthesis Example 81) | 60 (Synthesis Example 92) | 5.3 | 80 | 203 | 0.03 |
| Ex. 92 | 40 (Synthesis Example 81) | 60 (Synthesis Example 93) | 5.2 | 70 | 258 | 0.007 |
| Ex. 93 | 40 (Synthesis Example 81) | 60 (Synthesis Example 94) | 5.2 | 80 | 116 | 0.04 |
| Comp | 40 | 60 | 3.5 | 40 | 233 | 0.03 |

TABLE 25-continued

|  | PAI (wt. %) | LCP (wt. %) | Modulus (GPa) | Strength (MPa) | HDT (°C.) | Q value (cc/sec) |
|---|---|---|---|---|---|---|
| Ex. 91 | (Synthesis Example 87) | (Synthesis Example 91) | | | | |
| Comp Ex. 92 | 40 (Synthesis Example 87) | 60 (Synthesis Example 92) | 4.3 | 50 | 182 | 0.02 |
| Comp. Ex. 93 | 40 (Synthesis Example 87) | 60 (Synthesis Example 93) | 4.2 | 50 | 237 | 0.004 |
| Comp. Ex. 94 | 40 (Synthesis Example 87) | 60 (Synthesis Example 94) | 4.3 | 40 | 87 | 0.02 |

TABLE 26

|  | Modulus (GPa) | |
|---|---|---|
|  | Flow direction | Direction normal to the flow direction |
| Example 94 | 5.1 | 4.2 |
| Comparative Example 95 | 4.2 | 2.5 |

We claim:

1. A resin composition which comprises:

(A) an aromatic copolyamideimide containing 5 to 95 mol % of a recurring unit represented by the formula (1) and 5 to 95 mol % of at least one member selected from the group consisting of a recurring unit represented by the formula (2) and a recurring unit represented by the formula (3), provided that the total amount of these three recurring units is 100 mol %,

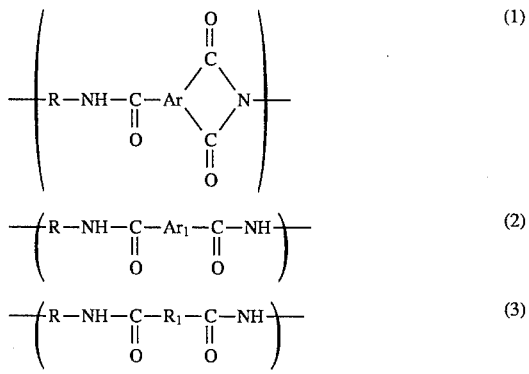

wherein Ar in the formula (1) denotes a trivalent aromatic group containing at least one 6-membered carbon ring, $Ar_1$ in the formula (2) denotes a divalent aromatic group containing at least one 6-membered carbon ring, $R_1$ in the formula (3) denotes a divalent aliphatic group, and R in the formulas (1), (2) and (3) denotes a divalent aromatic or aliphatic group, and (B) a polyester resin incapable of forming an anisotropic molten phase, the weight ratio of the aromatic copolyamideimide (A) and the polyester resin (B) ((A)/(B)) being 95/5 to 5/95, and the aromatic copolyamideimide (A) being prepared by conducting a polymerization reaction of an aromatic tricarboxylic acid anhydride and at least one member selected from the group consisting of an aromatic dicarboxylic acid and an aliphatic dicarboxylic acid with a diisocyanate compound in plural steps such that in a first step the polymerization reaction is conducted in a temperature range of 50° to 110° C. to terminate formation of an amide group and in a subsequent step the polymerization reaction is conducted in a temperature range of higher than 110° C. but not higher than 200° C. to form an imide group.

2. The resin composition of claim 1 wherein the amount of the recurring unit represented by the formula (1), which is contained in the aromatic copolyamideimide (A), is 10 to 70 mol % when the total amount of the above three recurring units is 100 mol %.

3. The resin composition of claim 2 wherein the amount of the recurring unit represented by the formula (1), which is contained in the aromatic copolyamideimide (A), is 10 to 50 mol %.

4. The resin composition of claim 1 wherein a reduced viscosity (measured in a dimethylformamide solvent at 30° C. in a concentration of 1 g/dl) of the aromatic copolyamideimide (A) is 0.1 to 2.0 dl/g.

5. The resin composition of claim 1 wherein the polymerization reaction for producing the aromatic copolyamideimide (A) is conducted in two or three steps.

6. The resin composition of claim 5 wherein the temperature for the polymerization reaction is set at 50° to 110° C. in the first step to terminate formation of an amide group, and the polymerization reaction is conducted in the subsequent steps at a temperature which is 20° to 80° C. higher than the temperature for the polymerization reaction in the first step.

7. The resin composition of claim 1 wherein the polyester resin is a polyalkylene terephthalate or a polyalkylene-2,6-naphthalenedicarboxylate.

8. The resin composition of claim 1 wherein the weight ratio of the aromatic copolyamideimide (A) and the polyester resin (B) ((A)/(B)) is 10/90 to 70/30.

9. The resin composition of claim 1, wherein the aromatic copolyamideimide (A) contains 10 to 30 mol % of the recurring unit represented by the formula (1) and 70 to 90 mol % of at least one of the recurring unit represented by the formula (2) and the recurring unit represented by the formula (3).

10. The resin composition of claim 1, wherein the weight ratio of the aromatic copolyamideimide (A) and the polyester resin (B) ((A)/(B)) is at least 10/90 but less than 50/50.

* * * * *